United States Patent
Nieberle

(10) Patent No.: US 6,547,184 B2
(45) Date of Patent: Apr. 15, 2003

(54) MODULAR TRIM PANELING AND OUTFITTING SYSTEM FOR AN AIRCRAFT PASSENGER CABIN INTERIOR

(75) Inventor: Jan Nieberle, Cologne (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/882,877

(22) Filed: Jun. 15, 2001

(65) Prior Publication Data

US 2002/0000491 A1 Jan. 3, 2002

(30) Foreign Application Priority Data

Jun. 15, 2000 (DE) .......................... 100 29 369

(51) Int. Cl.[7] ................................ B64C 1/00
(52) U.S. Cl. ................. 244/119; 244/120; 244/118.5
(58) Field of Search .................. 244/118.1, 118.5, 244/118.6, 117 R, 119, 120, 129.1

(56) References Cited

U.S. PATENT DOCUMENTS

| | | | | |
|---|---|---|---|---|
| 4,741,497 A | * | 5/1988 | Fox ........................ 244/117 R |
| 4,799,631 A | * | 1/1989 | Humphries et al. ...... 244/118.5 |
| 5,044,578 A | * | 9/1991 | White et al. ................ 244/119 |
| 5,108,048 A | * | 4/1992 | Chang ..................... 244/118.1 |
| 5,129,597 A | * | 7/1992 | Manthey et al. ......... 244/118.1 |
| 5,549,258 A | * | 8/1996 | Hart et al. ............... 244/118.1 |
| 6,056,239 A | * | 5/2000 | Cantu et al. ............. 244/118.6 |
| 6,062,509 A | * | 5/2000 | Burrows et al. ......... 244/118.5 |

* cited by examiner

Primary Examiner—Galen L. Barefoot
(74) Attorney, Agent, or Firm—W. F. Fasse; W. G. Fasse

(57) ABSTRACT

An aircraft passenger cabin includes modular interior components selected from ceiling panels, wall panels, dado panels, window funnels, light covers, and baggage compartments or hat racks. At least one interior component is a standardized modular building block that can be used uniformly and interchangeably in different cabin configurations and sizes, in different aircraft types having different fuselage cross-sectional sizes and configurations. The interior components are modularly combined so as to be adapted to different passenger cabins in the various aircraft types. The multiplicity of distinct interior components among all aircraft types in the entire product range of an aircraft manufacturer is reduced, so that the piece count of each particular type of component is increased, and the manufacturing, installation, maintenance, replacement and inventorying costs are reduced. The time and cost for a new cabin design are reduced.

32 Claims, 17 Drawing Sheets

| COMPONENT | HATRACK TYPE I | HATRACK TYPE II | HATRACK TYPE III | CEILING PANEL TYPE I | CEILING PANEL TYPE II | SIDEWALL PANEL TYPE I | SIDEWALL PANEL TYPE II | DADO PANEL TYPE I | DADO PANEL TYPE II |
|---|---|---|---|---|---|---|---|---|---|
| 1' | 2X | 2X | 1X | 1X | 2X | 2X | 2X | 2X | |
| 3' | | | | | | | | | 2X |

AIRCRAFT

PRIOR ART
FIG. IC

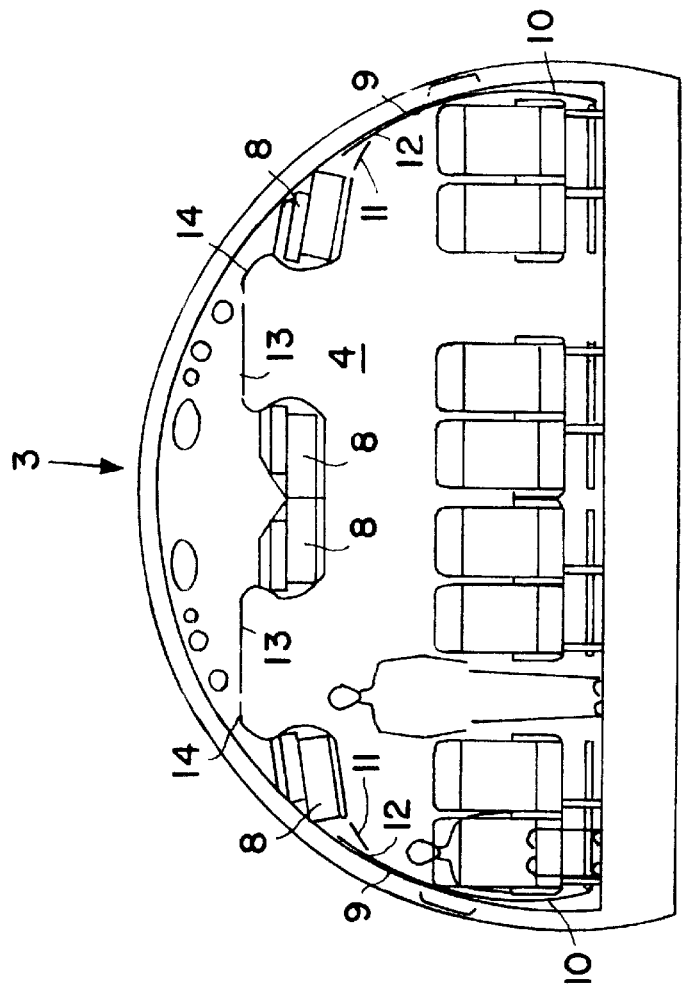
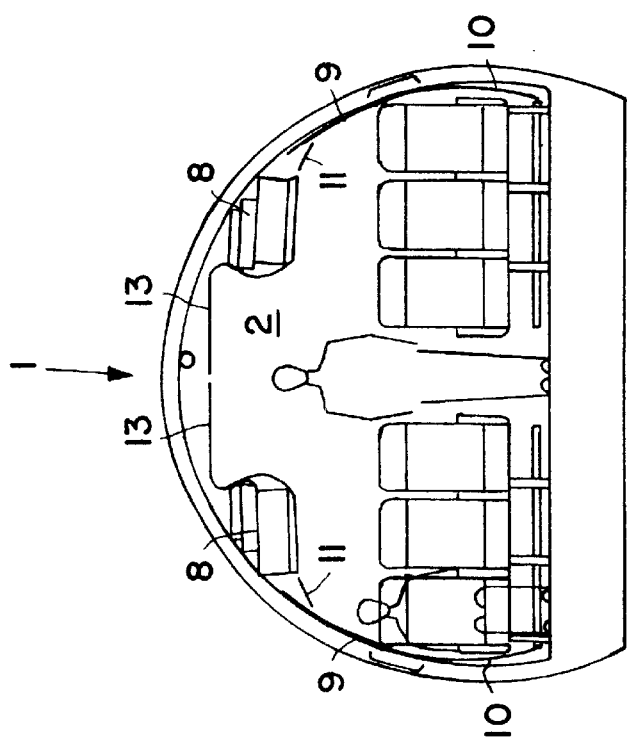
FIG.2B
FIG.2A

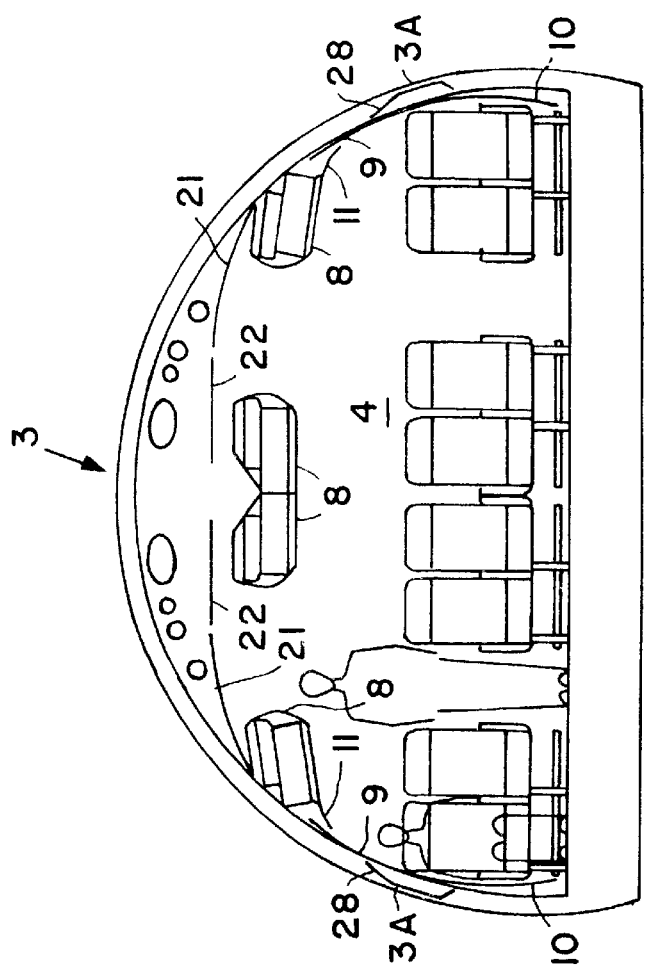
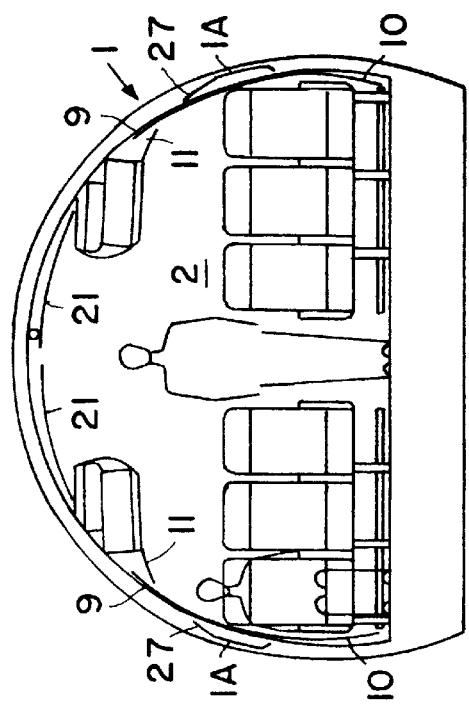
FIG.5B
FIG.5A

| COMPONENT → AIRCRAFT ↓ | HATRACK | DADO | SIDEWALL | FUNNEL 1/2/3/4 | CEILING | CEILING 1/2 | LIGHT COVER |
|---|---|---|---|---|---|---|---|
| | 8 | 10 | 9 | 28, 30, 27, 29 | 21 | 22 | 11 |
| 1 | 2X | 2X | 2X | 2X | 2X | – | 2X |
| 3 | 4X | 2X | 2X | 2X | 2X | 2X | 2X |
| 5 | 8X | 2X | 4X | 4X | 4X | 4X | 4X |

FIG. 5D

| COMPONENT → AIRCRAFT ↓ | HATRACK FRONT | HATRACK CENTER | DADO | MAIN SIDEWALL | UPPER SIDEWALL | FUNNEL 1/2/3/4 | CEILING |
|---|---|---|---|---|---|---|---|
| | 31 | 32 | 33 | 34 | 35 | 28, 27 | 30, 29, 36 |
| 1 | 2X | – | 2X | 2X | 2X | 2X | 1X |
| 3 | 4X | 1X | 2X | 2X | 2X | 2X | 2X |
| 5 | 8X | 2X | 2X | 4X | 4X | 4X | 4X |

FIG. 6D

MODULAR TRIM PANELING AND OUTFITTING SYSTEM FOR AN AIRCRAFT PASSENGER CABIN INTERIOR

PRIORITY CLAIM

This application is based on and claims the priority under 35 U.S.C. §119 of German Patent Application 100 29 369.7, filed on Jun. 15, 2000, the entire disclosure of which is incorporated herein by reference.

FIELD OF THE INVENTION

The invention relates to a modular system of trim paneling components and outfitting components, e.g. furnishings or accessories such as luggage bins or hat racks, for paneling and outfitting the interior of a passenger cabin of an aircraft.

BACKGROUND INFORMATION

It is generally known to provide a variety of trim components including side wall panels, lower wall or dado panels, ceiling panels, light-covers, joint or transition trim strips, and the like, as well as outfitting components such as baggage compartments or luggage stowage bins, which are generally also called hat racks. Conventionally, a specialized set of such trim components and outfitting components is particularly designed for each specific type of aircraft, whereby an aircraft type is defined by its fuselage cross-sectional shape and size.

The aircraft manufacturers as well as the airlines are constantly striving to provide improved passenger comfort in the aircraft passenger cabins, which constantly makes greater demands on all of the cabin components, including the trim components and the outfitting components. Moreover, it is desired by aircraft manufacturers and by the airlines operating the aircraft, to achieve a high degree of commonality of various components among the different individual aircraft types produced by a given aircraft manufacturer, in order to reduce the required inventory of spare parts or replacement parts, to allow a uniform maintenance schedule and procedure for all of the aircraft types, and to reduce the variety of different components that must be manufactured.

A further essential criteria for the product philosophy of an aircraft manufacturer is to achieve a common or uniform appearance and image, e.g. a so-called "corporate identity", among all of the aircraft types of this manufacturer. On the other hand, the airlines operating the aircraft desire a certain degree of design flexibility to establish their own desired uniform appearance, image, or "corporate identity" of the airline, independently of the particular manufacturer of the aircraft and independently of the aircraft type. In other words, the aircraft manufacturer aims to achieve a certain degree of commonality among all aircraft types in its product range, while the airline aims to achieve a certain degree of commonality among all the aircraft in its fleet, which may include aircraft of different types and different manufacturers.

As an example, the Airbus aircraft of the single aisle family, such as the A320 aircraft, have a cabin cross-sectional contour that expands or widens upwardly, to provide a large ceiling surface with a spacious open feeling, as well as an effective ceiling surface area to be used as an indirect lighting reflector to provide general lighting of the cabin. Furthermore, this characteristic feature has also been provided in the passenger cabin of the Airbus twin-aisle aircraft types, such as the A330/A340 aircraft.

Further in this regard, FIG. 1A schematically shows a cross-section through an aircraft fuselage 1' of the single aisle type having a relatively small fuselage diameter, while FIG. 1B schematically shows a cross-section through the fuselage 3' of an aircraft of the twin-aisle type with a relatively larger diameter. It can be seen in FIGS. 1A and 1B, that the passenger cabin 2' of the smaller aircraft 1' and the passenger cabin 4' of the larger aircraft 3' share certain common features of the overall appearance, such as the general appearance of the overhead hat racks or stowage bins, and the over-aisle head room that widens upwardly to an enlarged ceiling panel area. These cross-sectional views of FIGS. 1A and 1B further generally show the shapes of various components within the cabins, such as the hat racks, ceiling panels, side wall panels, and dado panels, which are also schematically shown in the chart or table of FIG. 1C. From FIGS. 1A, 1B and 1C, it becomes apparent that various differently configured trim components and outfitting components are respectively used for the smaller fuselage 1' of type I and for the larger fuselage 3' of type II, respectively, for achieving the above-mentioned generally similar appearance features of the two cabins 2' and 4'. The table of FIG. 1C summarizes how many of each of the trim components and outfitting components of type I and type II are used in a typical cross-section of the two different aircraft types 1' and 3'. For example, a typical cross-section of the fuselage 1' includes two of the type I hat racks, one of the type I ceiling panels, two of the type I side wall panels, and two of the type I dado panels, while a typical cross-section of the fuselage 3' includes two of the type II hat racks, one of the type II center hat racks, two of the type II ceiling panels, two of the type II side wall panels, and two of the type II dado panels.

It is apparent that the various components of type I and of type II are somewhat similar in shape, size and configuration with respect to each other, but are not identical. As a result, it is necessary to manufacture and inventory each of these parts with its own particular configuration for each of the fuselage types I and II independently. As a further result, in the conventional manner of carrying out a design of a new cabin layout, it has been necessary to individually and independently design all of the necessary trim components and outfitting components separately for this new cabin design, whereby the trim and outfitting components will have specialized configurations (e.g. dimensions and shapes) especially adapted to the particular new cabin design. This leads to great costs and expenditure of time for carrying out a new cabin design. Especially when the product range or product pallet of the manufacturer includes several different aircraft types, it becomes very costly and time consuming, because a completely new design and development of all the cabin interior components is necessary for each respective aircraft type of this product pallet. An example is the Airbus product range including the above mentioned aircraft, among others, as well as the new A380 passenger transport aircraft under development, with a still larger fuselage cross-section and two through-going passenger decks.

SUMMARY OF THE INVENTION

In view of the above, it is an object of the invention to provide an aircraft passenger cabin of the above described general type, and particularly to provide a system of trim components and outfitting components for such a passenger cabin, such that these components are modularly useable in plural differently-sized aircraft types of a given aircraft manufacturer. Therewith, the invention further aims to reduce the time required for designing a new cabin layout, while also achieving improved uniformity in maintenance procedures and a reduced inventory requirement for replacement parts. The invention further aims to avoid or overcome the disadvantages of the prior art, and to achieve additional advantages as apparent from the present specification.

The above objects have been achieved according to the invention in a passenger cabin of a passenger transport aircraft, including trim components and outfitting components installed in the interior of the passenger cabin, with at least one modular interior component, for example a hat rack (or stowage bin), a side wall panel, a lower wall or dado panel, a lateral light cover, a ceiling panel, a window funnel, and a junction area or gap trim component. This cabin interior component is utilizable in common in various different aircraft types having different fuselage cross-sectional sizes, whereby the interior component or components can be assembled together in a modular fashion to be adapted to the particular fuselage cross-sectional size at hand. Also in this context, the respective passenger cabin is adapted to the size relationships of the respective fuselage cross-sectional size. In this application, a passenger cabin is understood to be an area in an aircraft that is furnished for passenger occupancy, e.g. including seats, beds, or the like for the passengers.

The above objects have further been achieved according to the invention in a cabin interior trim paneling and outfitting system in which a plurality of trim components and/or outfitting components of a certain configuration (e.g. size and shape) are installed in common in plural aircraft fuselages respectively having different fuselage cross-sectional sizes, shapes and/or aircraft types.

With the inventive system, the total cost and time expenditure required for the new development of a passenger cabin design or layout, in connection with the development of a new aircraft type, may be advantageously reduced. By using trim components and outfitting components that are common across several different aircraft, types, the total number of different trim components and outfitting components is reduced in comparison to the prior art, and each individual trim component or outfitting component may be produced in a larger piece count or number. In this manner, the per piece cost may be reduced, because the tooling and equipment costs on a per piece basis are proportionately reduced in connection with the increase of the piece count of a given part that is manufactured. Moreover, the airlines or aircraft operators gain the advantage of a reduced inventory requirement for replacement parts, as well as a uniform maintenance program that is applicable to various different aircraft types, so that the cost and time expenditure for maintenance is simultaneously reduced.

According to further particular embodiment features according to the invention, various different interior components, e.g. trim components and outfitting components, and preferably all of the essential interior components that are utilized in furnishing a cabin interior, can be installed in a modular manner in various different passenger cabins having different cabin sizes. In other words, preferably all of the different components are fully interchangeable among all different sizes and configurations of passenger cabins in different aircraft types.

According to another detail of the invention, the curvature of a sidewall panel as a modular interior component corresponds to the curvature of the smallest fuselage cross-sectional size of the various aircraft types for which this sidewall panel may be used. With this feature, and in general to achieve uniform modular application of the various different components in various different sizes of aircraft, it is unavoidable that the shape of each of the components will not always be optimized to the shape and size of the respective fuselage in which the components are installed. However, according to the invention, any loss of space, i.e. non-optimal use of the volume available within the respective aircraft fuselage, can be minimized or at least shifted to insignificant areas at which a passenger will not notice or be disadvantaged by this loss of space.

By arranging a light cover to at least partially overlap the vertical height of the sidewall panel, the extent of this overlap can be adjusted to accommodate various different respective sizes of passenger cabins in different aircraft types.

In combination with the common or uniform standardized components, such as large surface components like sidewall panels, which may be used in common in various different aircraft types, the invention further provides specialized trim components that are particularly configured and dimensioned for a specific installation or application in a specific aircraft type. For example, a particular light cover that is respectively adapted for a particular aircraft type can be provided to cover a gap or transition between the common sidewall panel and the common hat rack, whereby this light cover has particular dimensions and the like adapted to the particular aircraft type in which it is installed. In this manner, the modular and uniform components can be used to best advantage, while still achieving a perfect fit or adaptation to different passenger cabins or other special requirements of unusual cabin arrangements or the like.

To achieve a greater degree of modularity, the sidewall panel itself may be modularly assembled from a main sidewall panel and an upper sidewall panel. This allows an even more versatile and adaptable application of the components to various different dimensions or other requirements of different aircraft passenger cabins, while still achieving an overall uniform system of components that is applicable to various different aircraft types.

The inventive arrangement further provides system mounting rails, at least in the area of the upper side walls of the aircraft fuselage, whereby the sidewall panels or at least the upper sidewall panels can be easily exchangeably mounted on these system rails. In this manner, it is simple to carry out airline-specific modifications or special arrangements, for example an alteration of the passenger class zones within the passenger cabin. This may be achieve preferably by changing the upper sidewall panels to other panels having a different decor scheme or the like. Another possibility is for the specific airline to express, or later change, its corporate image, for example by means of exchanging the upper wall panels with other panels having a different particular decor scheme, style, logo, or the like, without having to entirely remove the wall panels and rebuild the cabin interior trim from scratch.

The baggage compartments or hat racks may also be constructed as modular components further including a common hat rack front part and hat rack middle parts that can be used in common across several different aircraft types.

To accommodate different wall thicknesses of different aircraft types in the area of the passenger cabin windows, the invention provides a specialized window funnel, i.e. a window funnel having specialized dimensions, for covering the space or transition between the standardized sidewall panel and the respective window of an aircraft fuselage. Thereby the specialized window funnel is adapted to the dimensional requirements of this particular aircraft type.

In order to be able to use the ceiling panels uniformly or in common among different aircraft types, the dimensions of the ceiling panel are adapted to the dimensions of the ceiling area, of the smallest passenger cabin, i.e. the cabin of the smallest type of aircraft. In order to panel the larger ceiling areas of larger types of aircraft, these smaller common ceiling panels are used in combination with each other, or in combination with additional ceiling panel modules as required to meet the dimensional needs of the specific application.

BRIEF DESCRIPTION OF THE DRAWINGS

In order that the invention may be clearly understood, it will now be described in connection with example embodiments, with reference to the accompanying drawings, wherein:

FIG. 1C is a table representing the respective number of various trim components and outfitting components used on a typical cross-section of the type I aircraft and of the type II aircraft of FIGS. 1A and 1B;

FIG. 2A is a schematic sectional view generally similar to, FIG. 1A, but showing a cabin arrangement according to a first embodiment of the invention in the type I aircraft fuselage;

FIG. 2B is a schematic sectional view generally similar to FIG. 1B, but showing a cabin arrangement according to a first embodiment of the invention in a type II aircraft;

FIG. 5A corresponds to FIG. 2A, but shows a cabin arrangement according to a fourth embodiment of the invention;

FIG. 5B corresponds to FIG. 2B, but shows a cabin arrangement according to a fourth embodiment of the invention;

FIG. 5D corresponds to FIG. 2D, but with respect to the fourth embodiment of the cabin arrangement as shown in FIGS. 5A, 5B and 5C;

DETAILED DESCRIPTION OF PREFERRED EXAMPLE EMBODIMENTS AND OF THE BEST MODE OF THE INVENTION

Figure 1B:
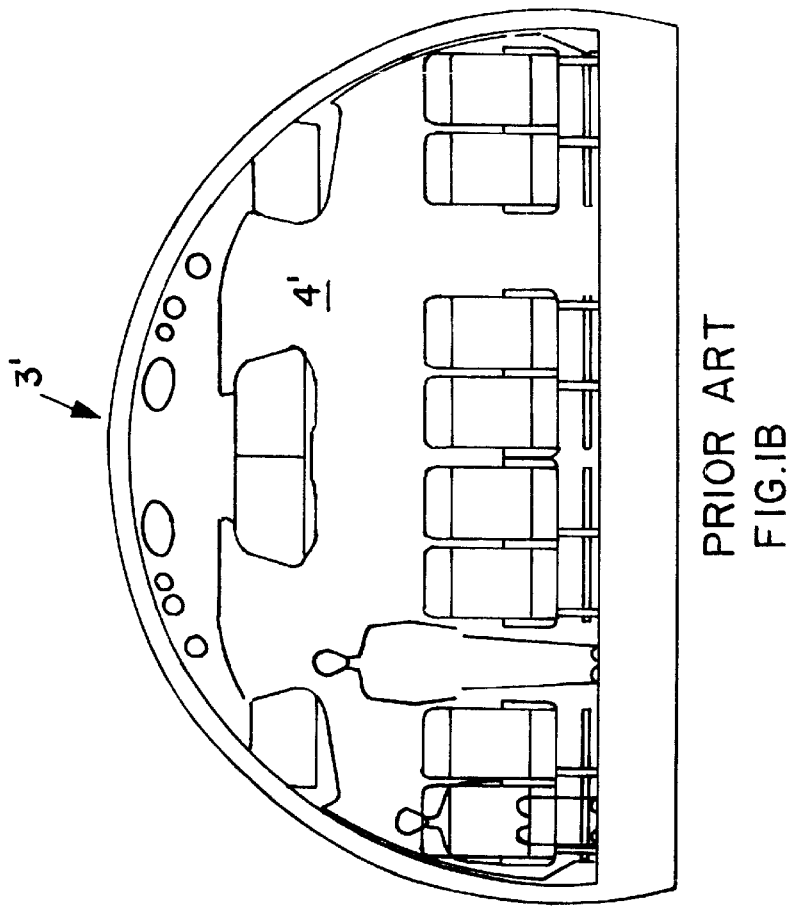
FIG. 1B schematically shows a cross-section of a type II aircraft having a larger diameter and twin aisles, with a conventional cabin.
Figure 1A:
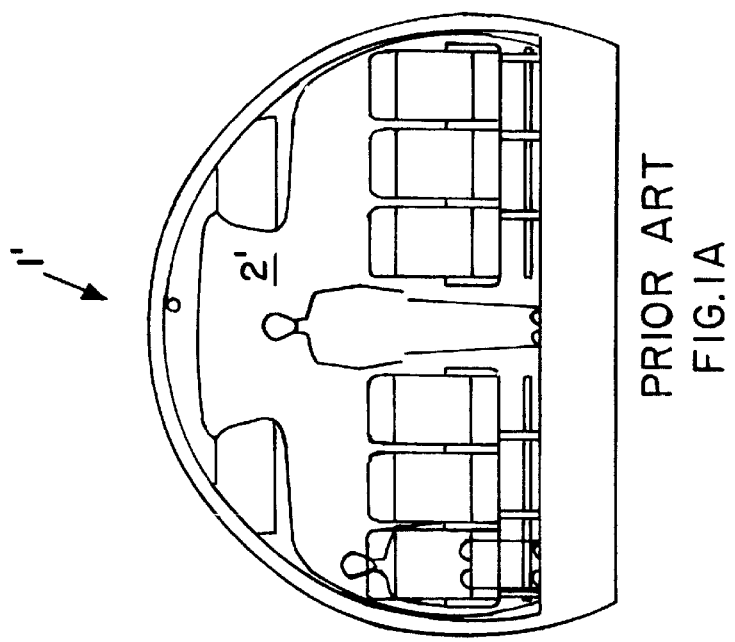
FIG. 1A schematically shows the cross-section of a type I aircraft having a relatively small fuselage diameter and a single center aisle, with a conventional cabin.

FIG. 1A schematically shows a cross-section of an aircraft fuselage 1' having a relatively small fuselage diameter, and having a conventionally furnished passenger cabin 2' therein. For example, such a conventional aircraft fuselage 1' may have a fuselage diameter of approximately 3.96 m, and belongs to the single aisle family of Airbus aircraft, for example the A320 aircraft among others. This cabin 2' has two lateral seating groups and a center aisle therebetween. On the other hand, FIG. 1B schematically shows an aircraft fuselage 3' having a somewhat larger fuselage diameter, and having a conventionally furnished passenger cabin 4' therein. This conventional aircraft fuselage 3', for example, belongs to the twin aisle family of Airbus aircraft, for example including the A330/A340 aircraft. This aircraft 3' has a fuselage diameter of approximately 5.64 m, for example. The cabin 4' has a center seating group, two lateral seating groups, and two aisles respectively therebetween.

FIG. 1C provides an overview of the various different trim components and outfitting components that are used in the two different aircraft of FIG. 1A (type I) and FIG. 1B (type II). Generally, the trim components and outfitting components include single baggage compartments or hat racks, double or center hat racks, ceiling panels, sidewall panels and dado panels, whereby type I components are used for the aircraft 1' of FIG. 1A, and type II components are used for the aircraft 3' of FIG. 1B. As can be seen from the schematic cross-sectional shapes of the components shown in FIG. 1C, and also apparent in FIGS. 1A and 1B, there is a similarity among the components of type I and the components of type II, in order to achieve a certain degree of uniformity or unity of the overall appearance of both aircraft types 1' and 3' (i.e. both cabins 2' and 4') within the product range of a particular aircraft manufacturer.

Nonetheless, the components of type I are not identical to the components of type II, so that the various components cannot be interchanged between the two different aircraft types of FIG. 1A and FIG. 1B. Thus, as can be seen in FIG. 1C, it is necessary to manufacture and inventory a complete set of the trim components and outfitting components of type I and a complete set of the trim components and outfitting components of type II, respectively for the two different aircraft 1' and 3'. In this example, it is therefore necessary to manufacture and inventory three different hat racks, two different ceiling panels, two different sidewall panels, and two different dado panels for these two different aircraft, resulting in a total of nine different parts. The piece count of each of these nine different parts required on a given representative cross-section of each of the aircraft types is given in FIG. 1C.

Figure 2C:
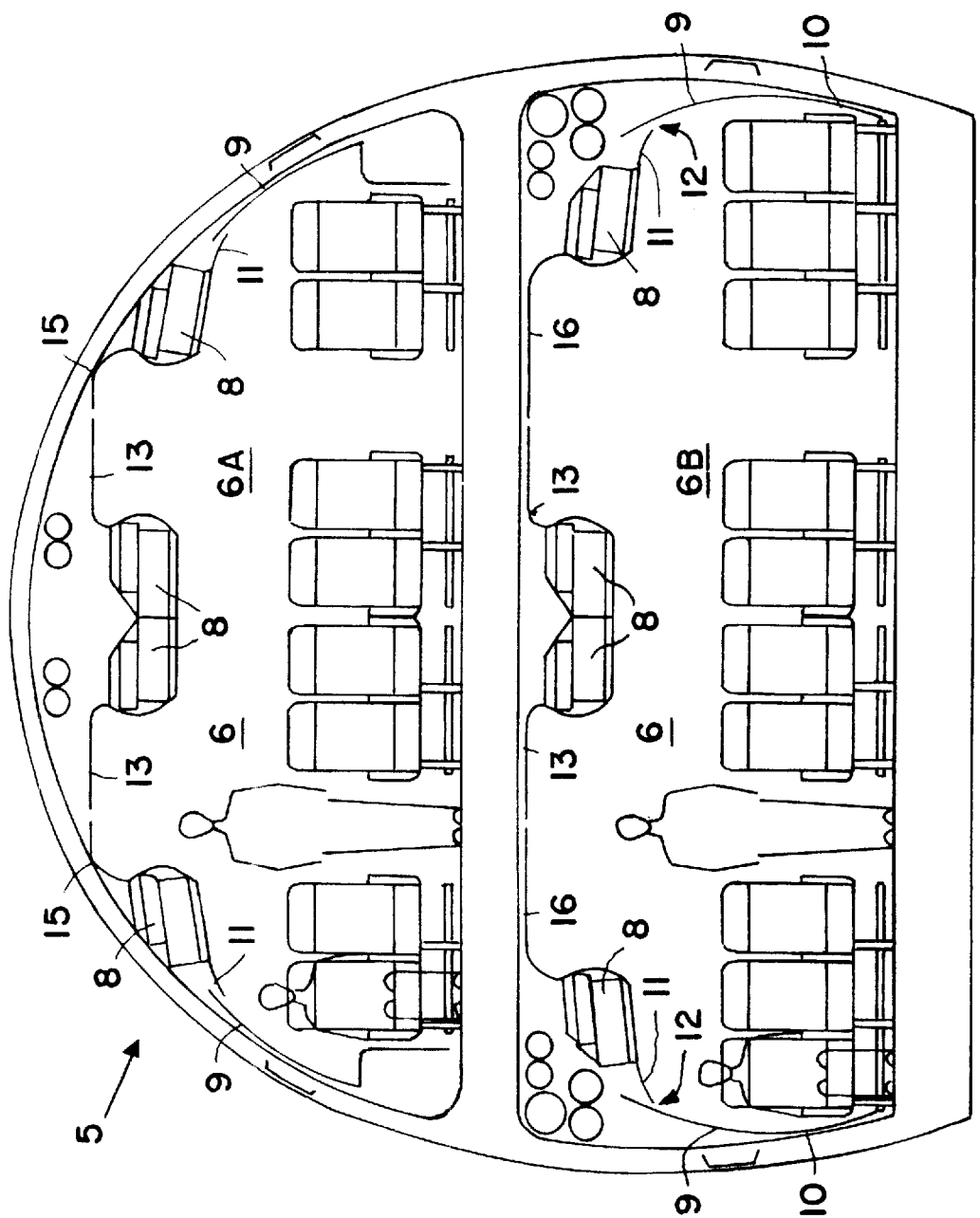
FIG. 2C is a schematic cross-section of a type III aircraft fuselage, with two passenger decks each outfitted with a respective cabin arrangement according to a first embodiment of the invention.

In contrast to the above described FIGS. 1A, 1B and 1C, the invention aims to provide standardized modular trim and outfitting components that can be used uniformly or interchangeably among different aircraft types. FIGS. 2A to 2D show a first embodiment of the invention. FIGS. 2A and 2B respectively show two aircraft 1 and 3 of type I and type II as shown and described above in connection with FIGS. 1A and 1B. However, as will be described next, these aircraft 1 and 3 are equipped with passenger cabins 2 and 4 having components according to the invention. Furthermore, as shown in FIG. 2C, the inventive cabin arrangement is also applicable to a passenger cabin 6 including a continuous or through-going upper deck 6A and a continuous or through-going lower deck 6B, in a large high capacity aircraft having a fuselage with an oval cross-section, which is currently under development. According to the invention, the trim components and outfitting components can be used uniformly and interchangeably among all three of these types of aircraft 1, 3 and 5.

Advantageously, the multiplicity of different components can be reduced, and the available set of building blocks represented by the available trim and outfitting components can be easily used for designing a new aircraft cabin arrangement. This achieves advantages as discussed above. For example, using a single type or configuration of hat rack 8 for all of the cabins 2, 4 and 6 in all of the aircraft 1, 3 and 5, rather than separate specialized hat racks (as in the prior art) will achieve a seven-fold reduction of the different configurations of hat racks as well as a seven-fold increase of the total number of the single hat rack 8 that is to be manufactured.

Figure 2D:
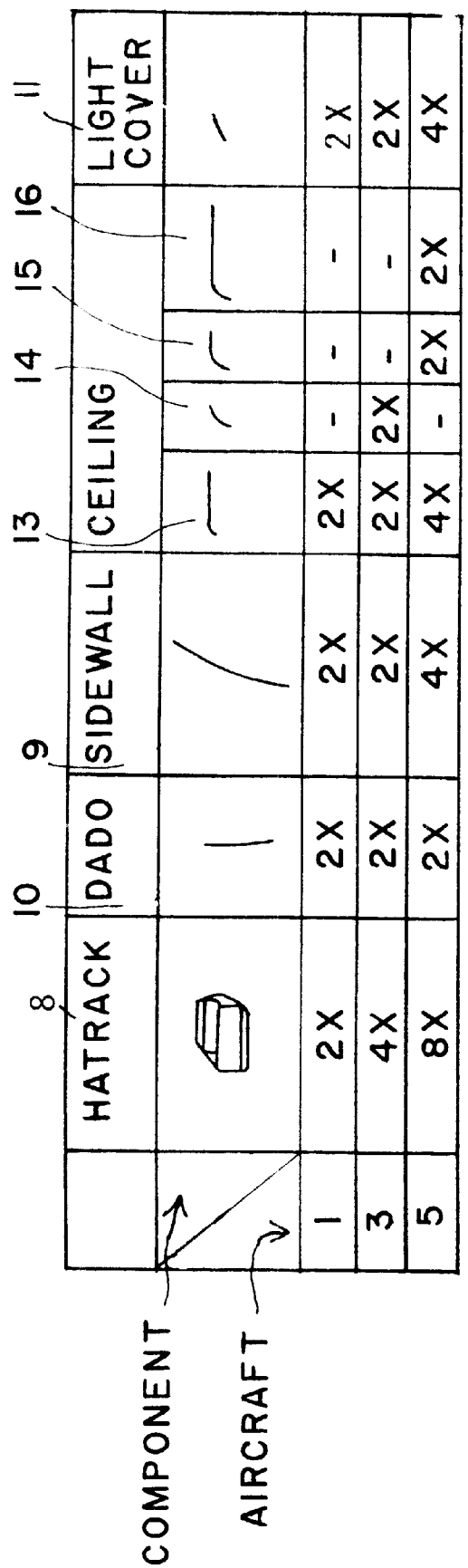
FIG. 2D is a, table representing the number of each one of various trim components and outfitting components used in a typical cross-section of the respective aircraft of FIGS. 2A, 2B and 2C.

FIG. 2D represents the numbers of various components that will be needed for a typical cross-section of each of the aircraft 1, 3 and 5. From FIG. 2D it is apparent that the various components such as the hat rack 8, dado panel 10, sidewall panel 9, and light cover 11 can be used in a standardized uniform manner in each of the different aircraft 1, 3 and 5. As will be discussed further below, four different ceiling panel components 13, 14, 15 and 16 are provided, which may be combined with each other in a modular manner as needed, to be adapted to the different ceiling areas of the passenger cabins 2, 4 and 6 of the different aircraft 1, 3 and 5.

Due to the different fuselage diameters and thus different radii of curvature and circumferential distances or lengths of the wall areas to be paneled in the passenger cabins 2, 4 and 6 of the different aircraft 1, 3 and 5, these differences must be taken into account in connection with the side walls 9 and the dado panels 10. However, the invention aims to avoid the need of providing several different sizes and curvatures of side wall panels and dado panels. Thus, in a preferred embodiment, the radius of curvature of the side wall panel 9 is adapted to the nearly circular curvature of the fuselage cross-section of the smallest fuselage 1, with the size of approximately 4000 mm (e.g. about 3960 mm).

Since the sidewall panel 9 is curved corresponding to this smallest radius of curvature among the different aircraft 1, 3 and 5, this sidewall panel 9 will not optimally match the curvature of the fuselage 3 having a diameter of e.g. 5640 mm, so that a small loss of cabin interior space will result, for example as seen in the lower-left and lower-right areas of FIG. 2B. In this area, namely in the foot space of the passengers, this loss of available space is barely noticeable, if at all, and is bridged over by a corresponding dado panel 10.

FIG. 2C further shows how this standardized sidewall panel 9 having a relatively small radius of curvature can be used effectively even in the much larger aircraft 5 having an oval cross-section enclosing the passenger cabin 6. As shown in FIG. 2C, the installation of the standardized sidewall panel 9 in the upper deck cabin 6A results in only a very small loss of space, since the radius of curvature of the fuselage in this area is generally similar to the curvature of the sidewall panel 9. On the other hand, in the lower passenger deck 6B there is a larger divergence between the relatively small radius of curvature of the sidewall panel 9 and the largest radius of curvature of the aircraft fuselage 5 in this area. Nonetheless, by appropriately arranging the sidewall panel 9 as shown, the resultant loss of space can be shifted or positioned to an overhead area in which it is not a significant disadvantage, without encroaching on or limiting the elbow and shoulder space available for the passengers in the area of the greatest width of the cabin 6 in the lower or middle deck 6B.

FIGS. 2A, 2B and 2C further show the use of a trim component, and particularly a lateral light cover 11 for covering and thereby compensating for the different sidewall heights of the cabins 2, 4 and 6 of the different aircraft 1, 3 and 5, which are being paneled with a single standardized size of the sidewall panels 9. Namely, the varying excess height (or on the other hand, the gap area left by an insufficient height) of the sidewall panel 9 relative to the wall space to be paneled in the respective passenger cabin is simply covered by the standardized lateral light cover 11. This is a simple manner of allowing a flexible design and arrangement, and an easy and economical way of covering and hiding various transition or gap areas in the trim paneling of the aircraft cabin. A further possibility, is that any remaining or existing gap areas 12 between the side wall panels 9 and the lateral light covers 11 can be used as air outlets for the air conditioning system of the passenger cabin, for example, in a preferred embodiment.

As mentioned above, four different shapes and sizes of ceiling panels 13, 14, 15 and 16 are provided for paneling the ceiling areas of the passenger cabins 2, 4 and 6, by appropriately combining different ones of these panels with each other. For the small aircraft fuselage 1 show in FIG. 2A, two of the ceiling panels 13 are mounted side-by-side in a mirror-symmetrical arrangement to panel the ceiling area of the cabin 2 in an installation friendly manner.

For the aircraft fuselage 3 shown FIG. 2B, having two aisles, the ceiling area over each aisle is covered or paneled by a combination of one of the ceiling panels 13 and a specialized ceiling panel 14 that covers the area between the outer edge of the ceiling panel 13 and the outer lateral hat rack 8 on each side of the cabin. Thus, the total arrangement in this aircraft fuselage 3 includes two of the ceiling panels 13 and two of the ceiling panels 14 in a given cross-section.

For the largest aircraft fuselage 5 as shown in FIG. 2C having two passenger decks 6A and 6B, the ceiling paneling includes four of the ceiling panels 13, namely one of these panels 13 above each aisle adjoining the center or middle hat racks 8. Additionally, the ceiling paneling includes a respective specialized ceiling panel 15 adjoining the respective ceiling panel 13 above. each aisle in the upper deck 6A and extending outward to the outer lateral hat racks 8. In the lower deck 6B, a larger specialized ceiling panel 16 extends above each aisle from the respective ceiling panel 13 outwardly to the outer side hat rack 8. Since the overall system or arrangement according to the invention includes four different ceiling panels 13, 14, 15 and 16, these may respectively be regarded as type I, type II, type III, and type IV ceiling panels.

Figure 3B:
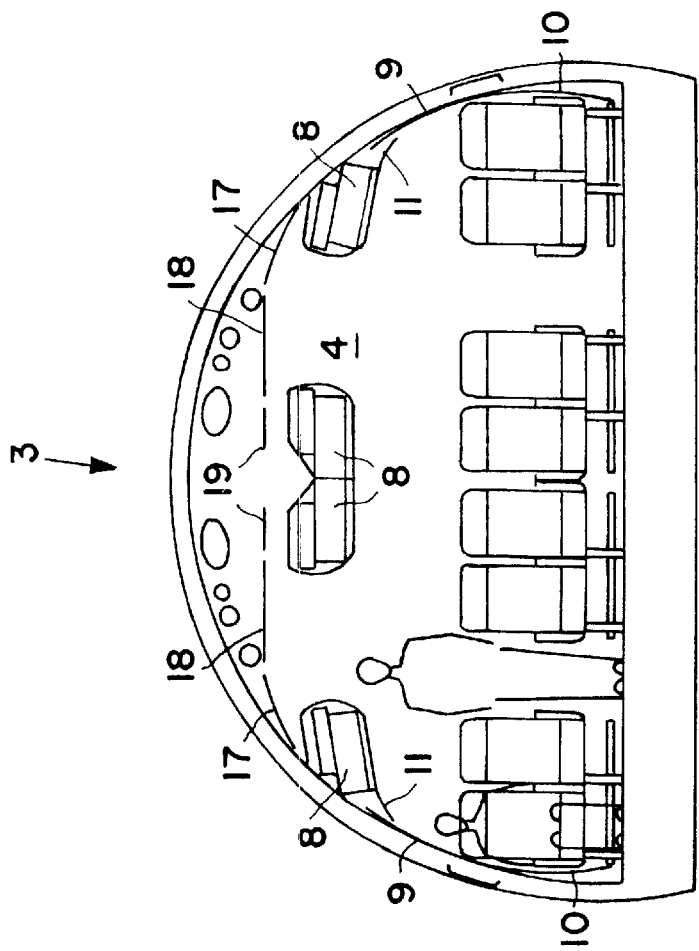
FIG. 3B corresponds to FIG. 2B, but shows a cabin arrangement according to a second embodiment of the invention.
Figure 3A:
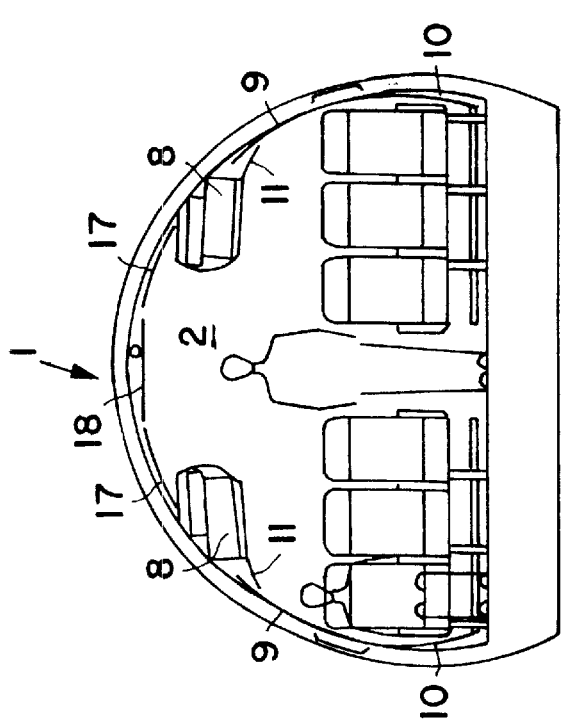
FIG. 3A corresponds to FIG. 2A, but shows a cabin arrangement according to a second embodiment of the invention.
Figure 3C:
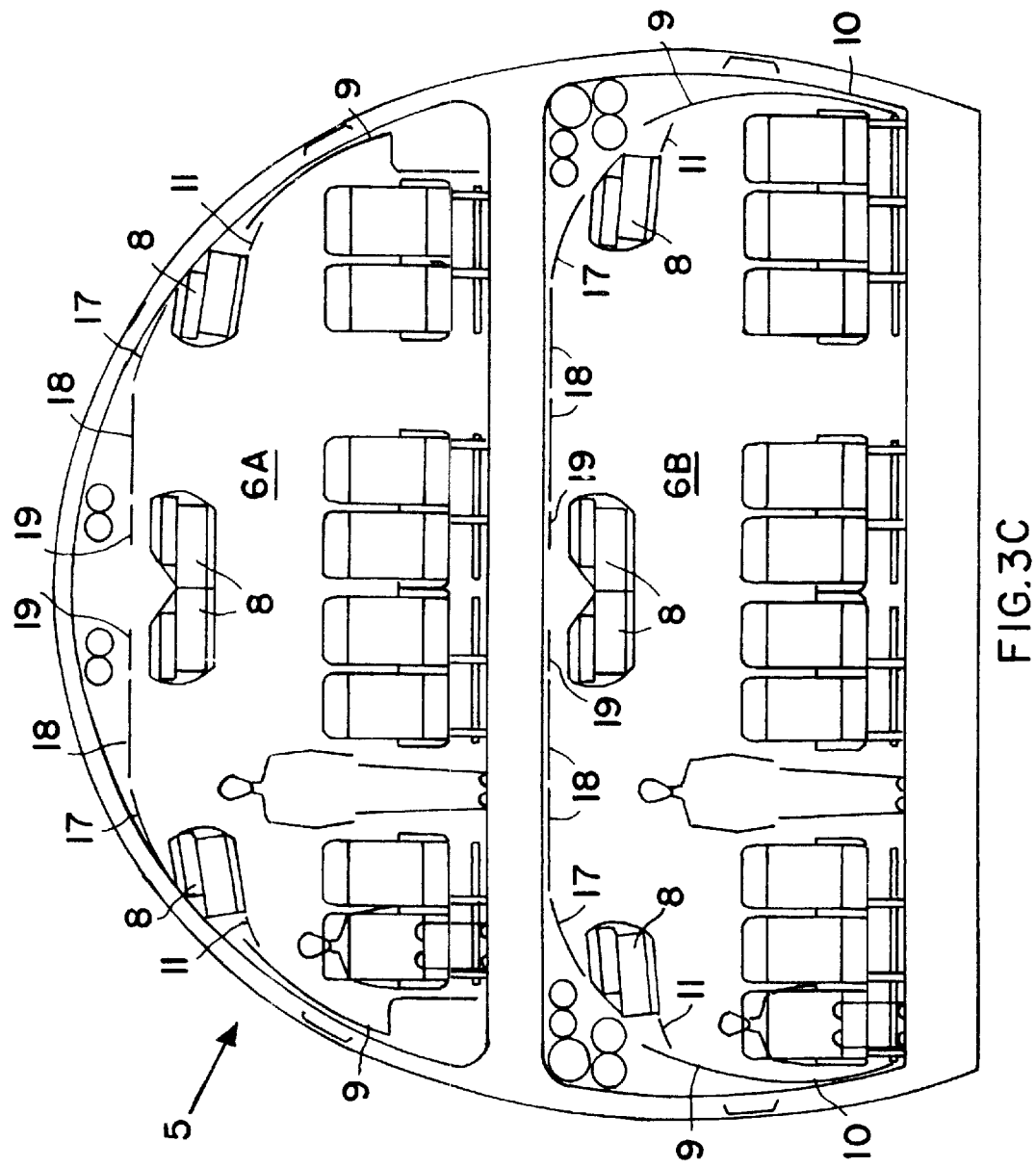
FIG. 3C corresponds to FIG. 2C, but shows a cabin arrangement according to a second embodiment of the invention.
Figure 3D:
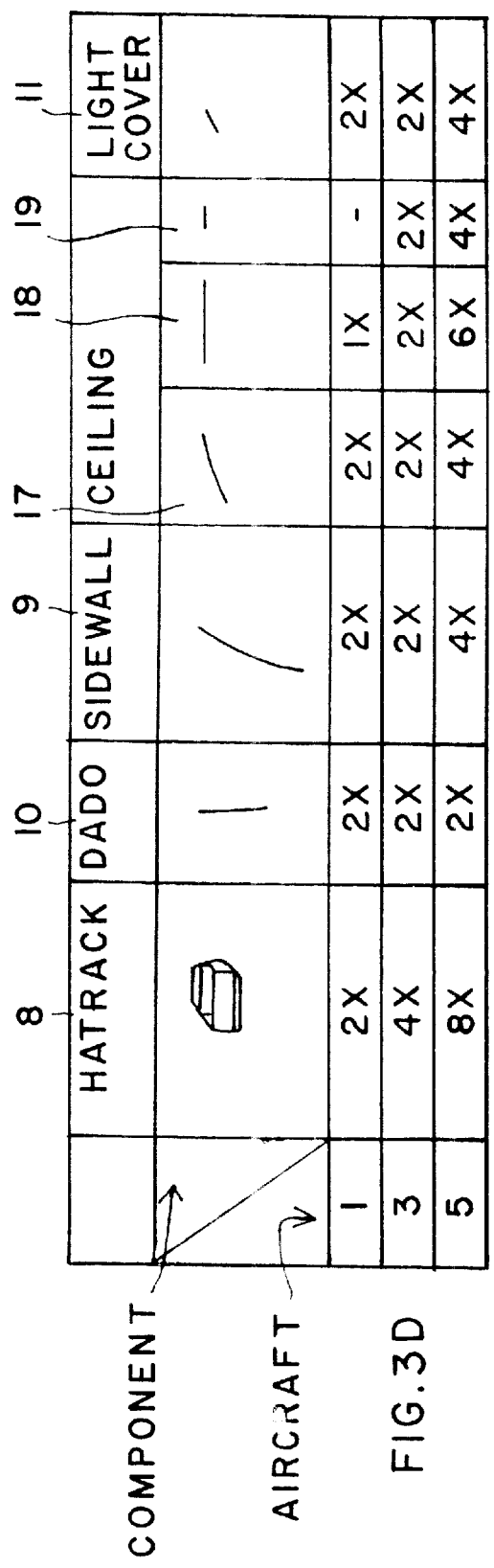
FIG. 3D corresponds to FIG. 2D, but with respect to the second embodiment of the cabin arrangement as shown in FIGS. 3A, 3B and 3C.

FIGS. 3A to 3D show a second example embodiment of the invention, whereby FIG. 3A generally corresponds to FIG. 2A, FIG. 3B generally, corresponds to FIG. 2B, FIG. 3C generally corresponds to FIG. 2C, and FIG. 3D generally corresponds to FIG. 2D. In this embodiment, hat racks 8, lateral light covers 11, sidewall panels 9, and lower wall or dado panels 10 are used in the same manner, in principle, as in the above described first embodiment. In this embodiment, however, the number of different types of ceiling panels could be reduced from four different types of ceiling panels 13, 14, 15 and 16 in the first embodiment to three different types of ceiling panels 17, 18 and 19 in this second embodiment. This reduction in the number of different ceiling panel components correspondingly relates to an increase in the piece count of a particular type of the ceiling panel components, which reduces the production and installation costs and efforts as described above.

The ceiling of the passenger cabin 2 in the aircraft fuselage 1 having the smallest fuselage diameter is carried out in a three piece manner in this second embodiment as shown in FIG. 3A. Particularly, the ceiling paneling in FIG. 3A includes two ceiling panels 17 and one ceiling panel 18 arranged between the two panels 17. The ceiling of the passenger cabin 4 as shown in FIG. 3B, with two aisles and two ceiling areas is carried out with six pieces total. Namely, a respective curved ceiling panel 17 covers the outer ceiling area respectively above each aisle, while the central ceiling area above each aisle is covered by the nearly planar or only slightly curved ceiling panel 18, and a smaller nearly planar ceiling panel 19 adjoins the panel 18 toward the center plane of the aircraft above each aisle, i.e. covering a ceiling area above the center hat racks 8.

In the multi-deck aircraft fuselage 5 shown in FIG. 3C, the passenger cabin in the upper deck 6A includes a similar arrangement of the ceiling panels 17, 18 and 19 above each of the two aisles as is used in the aircraft fuselage 3 shown in FIG. 3B and described above. The lower deck 6B includes the three ceiling panels 17, 18 and 19 on the ceiling above each aisle generally as described above in the upper deck 6A and also in the arrangement in FIG. 3B, but further includes an additional nearly planar or only slightly curved ceiling panel 18 adjoining the first-mentioned ceiling panel 18, to provide a wider substantially planar ceiling area above each aisle in this middle deck 6B. In other words, beginning from the outer ceiling area above the outer hat racks 8, the ceiling paneling above each aisle includes a curved ceiling panel 17, followed by two adjacent substantially flat planar ceiling panels 18, followed by a smaller substantially flat ceiling panel 19.

Due to the symmetrical arrangement of the trim components relative to the center plane of the fuselage along the fuselage lengthwise axis, the aircraft 5 having an oval fuselage cross-section will require a total of four ceiling panels 17, six ceiling panels 18 and four ceiling panels 19 among the upper and middle decks 6A and 6B on a given representative cross-section. This information as well as the other piece count information for each trim and outfitting component being used in the three different aircraft 1, 3 and 5 in this second embodiment are summarized in the table of FIG. 3D.

In a third embodiment of the invention as shown in FIGS. 4A to 4D, the multiplicity of different types of trim and outfitting components has been further reduced, especially with regard to a reduction of the different types of ceiling panels. In this embodiment, the hat racks 8, sidewall panels 9 and dado panels 10 are used in the same manner, in principle, as in the previously described embodiments. However, in this embodiment, the relatively small surface area light covers include four different exactly-fitting specialized types 23, 24, 25 and 26 of light covers. Namely, exactly the proper fitting dimensions and shape of the respective light cover are provided respectively for the aircraft fuselage 1, the aircraft fuselage 3, and the upper deck 6A and middle deck 6B of the aircraft fuselage 5. This provides the advantage of avoiding the variable overlap of the light covers and the sidewall panels as described in the above embodiments, whereby various specialized structural possibilities are offered, to provide type-specific structural elements, for example air conditioning air outlets directly in the light covers or in the area of the light covers.

While the number of different types of the small light covers 23, 24, 25 and 26 has been increased, simultaneously the present third embodiment reduces the number of different types of ceiling panels to just two different ceiling panels 21 and 22. Since the manufacturing costs per piece, as described above, are especially reduced by increasing the piece count of each respective large area ceiling panel 21 and 22, the overall result of providing a reduced number of different types of ceiling panels 21 and 22 together with an increased number of different types of light covers 23, 24, 25 and 26 does not increase the total cost and time expenditures, but rather may achieve a reduction of the total cost and time expenditure.

Figure 4D:
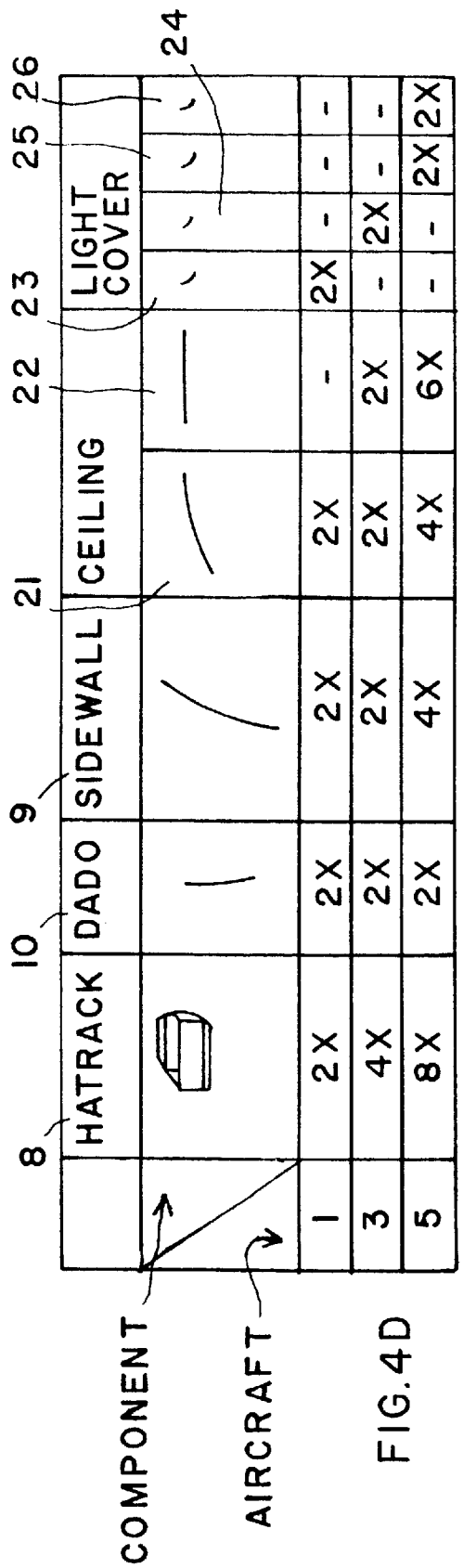
FIG. 4D corresponds to FIG. 2D, but with respect to the third embodiment of the cabin arrangement as shown in FIGS. 4A, 4B and 4C.
Figure 4B:
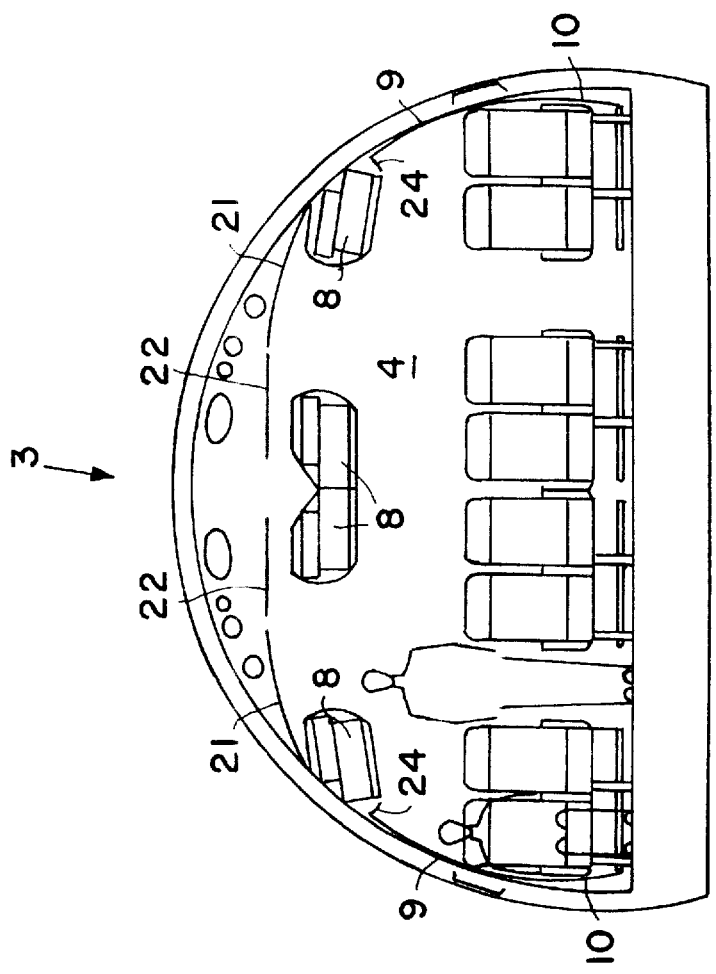
FIG. 4B corresponds to FIG. 2B, but shows a cabin arrangement according to a third embodiment of the invention.
Figure 4A:
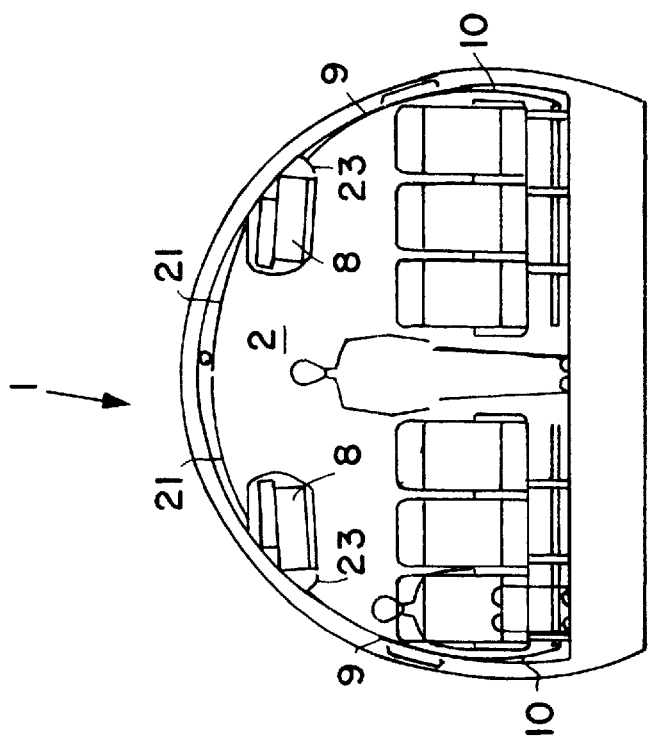
FIG. 4A corresponds to FIG. 2A, but shows a cabin arrangement according to a third embodiment of the invention.

In this third embodiment, the ceiling of the,passenger cabin 2 in the aircraft fuselage 1 having the smallest diameter as shown in FIG. 4A is carried out in two parts, i.e. the ceiling paneling consists of two symmetrically arranged curved ceiling panels 21. On the other hand, the ceiling of the passenger cabin 4 in the aircraft fuselage 3 having two aisles in this embodiment as shown in FIG. 4B is carried out with a total of four ceiling panel components. Namely, on the ceiling area above each aisle, one respective curved ceiling panel 21 covers the outer ceiling area, while a nearly planar or only slightly curved ceiling panel 22 adjoins the panel 21 to cover the central ceiling area. This combination of the two panels 21 and 22 above each aisle is sufficiently wide to cover the ceiling areas extending entirely between the outer side hat racks 8 and the middle or central hat racks 8.

Figure 4C:
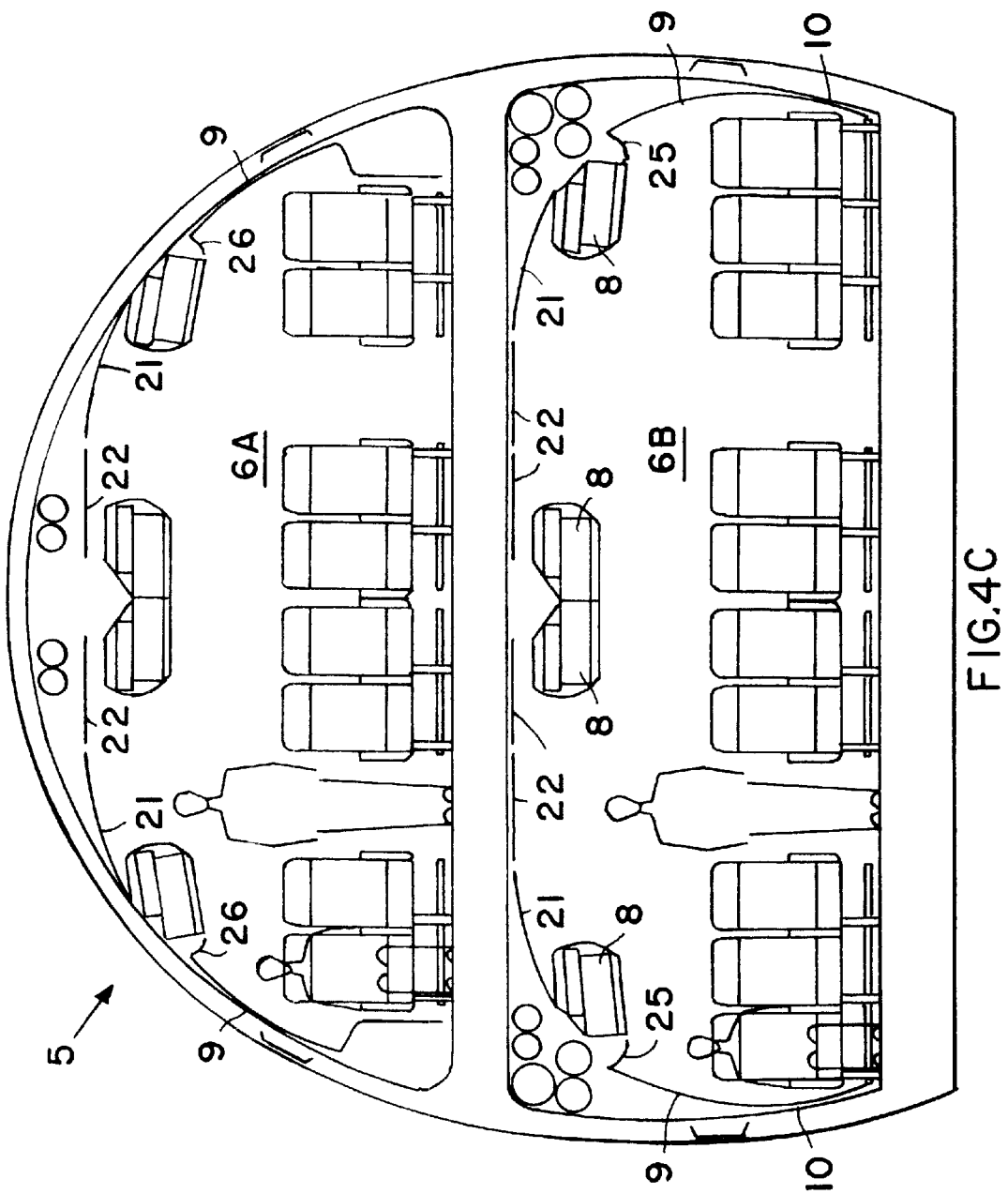
FIG. 4C corresponds to FIG. 2C, but shows a cabin arrangement according to a third embodiment of the invention.

The aircraft fuselage 5 shown in FIG. 4C has an arrangement of one ceiling panel 21 and one ceiling panel 22 above each of the two aisles in the upper deck 6A, in the same arrangement as described above for the passenger cabin 4 in FIG. 4B. In the middle deck 6B, the ceiling paneling above each of the two aisles includes one of the curved ceiling panels 21 arranged on the laterally outer ceiling area, and two of the nearly planar or only slightly curved ceiling panels 22 extending from the panel 21 to the area of the central hat racks 8. In view of the typical symmetrical arrangement of the trim components relative to the central plane of the aircraft along the aircraft longitudinal axis, the aircraft fuselage 5 having an oval cross-section will require a total of four of the ceiling panels 21 and six of the ceiling panels 22 among the upper deck 6A and middle deck 6B. Note that the term "middle deck" as used herein simply refers to a passenger deck below the upper deck, whether or not there is another passenger deck space below the middle deck. Namely, the middle deck may be the lowermost passenger occupiable space, with only a luggage and cargo hold therebelow, in some aircraft configurations.

The respective piece count of the various trim and outfitting components of the third embodiment as used in the aircraft 1, 3 and 5 shown in FIGS. 4A, 4B and 4C is summarized in the table of FIG. 4D. It must be understood that the indicated piece count pertains to the number of components used on any given representative cross-section of the fuselage.

A fourth embodiment of the invention is shown in FIGS. 5A to 5D. The cross-sectional views of the fuselages 1, 3 and 5 shown in FIGS. 5A, 5B and 5C each include a combination of trim and out fitting components of the second and third embodiments as described above, so as to achieve a roomy total outfitting and adaptation of the respective passenger cabins with the greatest possible economy. This embodiment further takes into account that the varying fuselage geometries of the fuselages 1, 3 and 5 each require a different adaptation or fitting of the transition from the windows 1A, 3A, or 5A of the fuselages 1, 3 or 5 to the respective sidewall panels 9. These fitting or adapted transitions in the respective fuselages 1, 3 and 5 are provided by specially sized window funnels 27, 28, 29 or 30.

5D shows a general overview of the several trim and outfitting components, as well as the, piece count of the components being used on a respective representative cross-section of each of the three fuselages according to this fourth embodiment. In general, in this embodiment, the hat racks 8, the sidewall panels 9 and the dado panels 10 principally are used in the same manner as in the above described prior embodiments. The light covers 11 correspond to those described above in connection with the second embodiment.

Figure 5C:
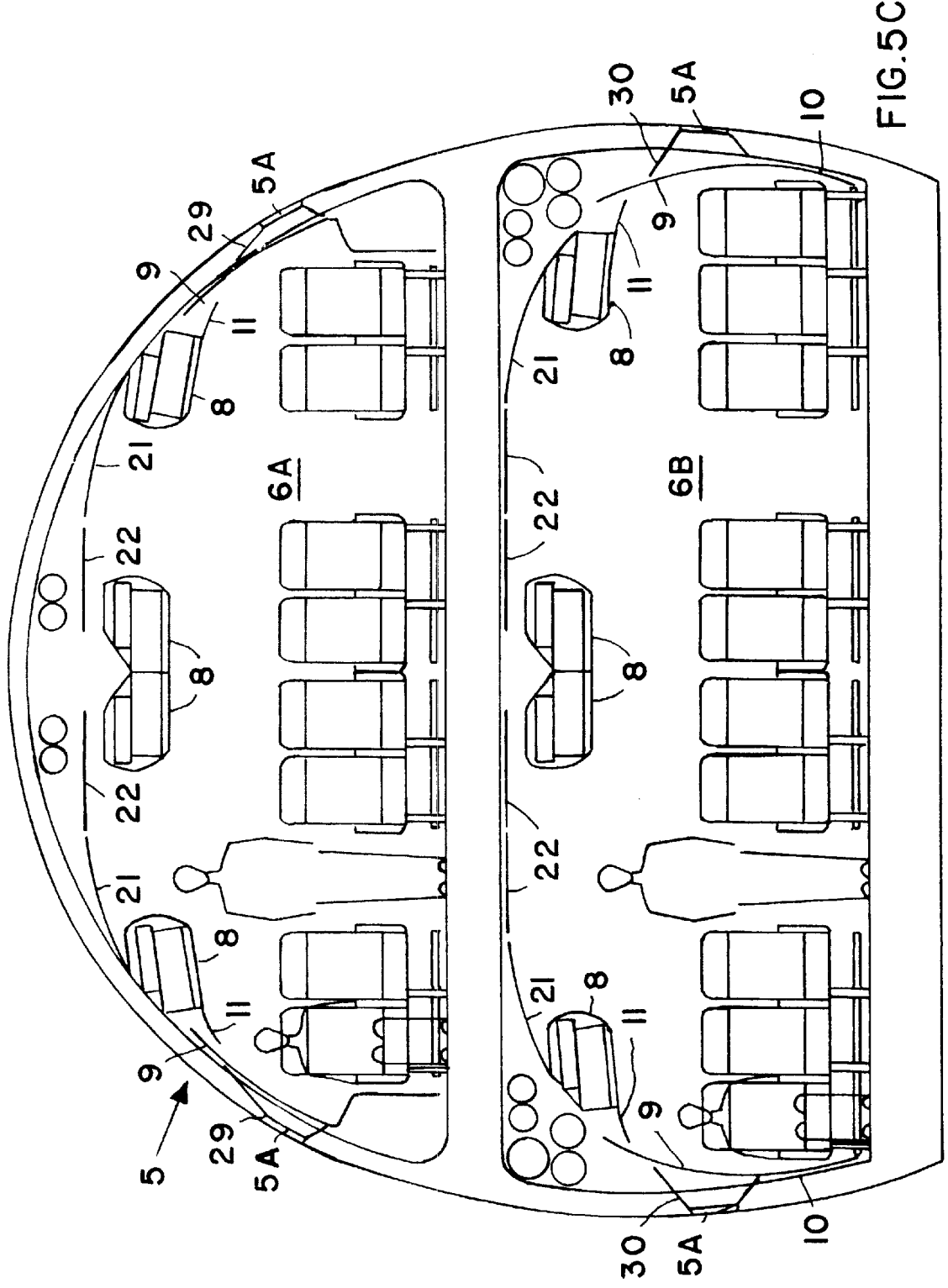
FIG. 5C corresponds to FIG. 2C, but shows a cabin arrangement according to a fourth embodiment of the invention.

More particularly, the ceiling of the passenger cabin 2 in the aircraft fuselage 1 according to FIG. 5A is carried out in a two-part manner, namely consisting of two symmetrically arranged curved ceiling panels 21. The ceiling of the passenger cabin 4 of the two aisle aircraft 3 shown in FIG. 5B includes a respective curved ceiling panel 21 covering the laterally outer ceiling area above each aisle, and a nearly planar or only slightly curved ceiling panel 22 adjoining the panel 21 and covering the central ceiling area while extending sufficiently toward the center plane to cover the ceiling up to and above the central hat racks 8. The upper deck 6A of the aircraft fuselage 5 shown in FIG. 5C includes an arrangement of ceiling panels 21 and 22 corresponding to that of the passenger cabin 4 of the aircraft 3 shown in FIG. 5B. The middle deck 6B of this aircraft shown in FIG. 5C uses one curved ceiling panel 21 and two adjoining planar or only slightly curved ceiling panels 22 above each aisle, in the same arrangement as described above in connection with the third embodiment shown in FIG. 4C.

An additional significant detail of the present fourth embodiment shown in FIGS. 5A, 5B and 5C is the use of the specialized window funnels 27, 28, 29 and 30 to accommodate the different wall thickness between the windows 1A, 3A or 5A and the corresponding associated sidewall panels 9 of the aircraft 1, 3, and 5. In the smallest aircraft 1 shown in FIG. 5A, a window funnel 27 having the smallest funnel depth is used, since the sidewall panel 9 closely matches the curvature of this smallest fuselage 1. The fuselage 3 shown in FIG. 5B requires a window funnel 28 with a slightly greater funnel depth. The upper deck 6A and middle deck 6B of the fuselage 5 shown in FIG. 5C respectively require the window funnels 29 and 30 with respectively adapted funnel depths, whereby the middle deck 6B requires the greatest funnel depth of the window funnel 30. The window funnel 29 may correspond to the funnel 28, or may be differently dimensioned or configured.

FIGS. 6A to 6D show a fifth embodiment of modular cabin components, i.e. trim components and outfitting components, whereby special significance is shown by the modularity of individual trim components. For example, the sidewall panel is formed from a main sidewall panel 34 and an upper side wall panel 35. The baggage compartments, stowage bins or hat racks are formed from standardized uniform hat rack front parts 31, predominantly providing a standardized loading access door, for example, which is mounted onto a standardized or non-standardized stowage bin body. The front parts 31 can be used in common for all of the aircraft types, for example the aircraft fuselages 1, 3 and 5. The hat racks further include hat rack middle parts 32 that are standardized and useable for the middle or center hat racks of all the multi-aisle aircraft types, for example in the passenger cabins 4 and 6. The lateral hat rack body components (not individually reference numbered) are, for example, specially configured hat rack bodies or shells that are adapted specifically to the particular aircraft type in which they are to be installed, so as to make optimal use of the available space.

Figure 6B:
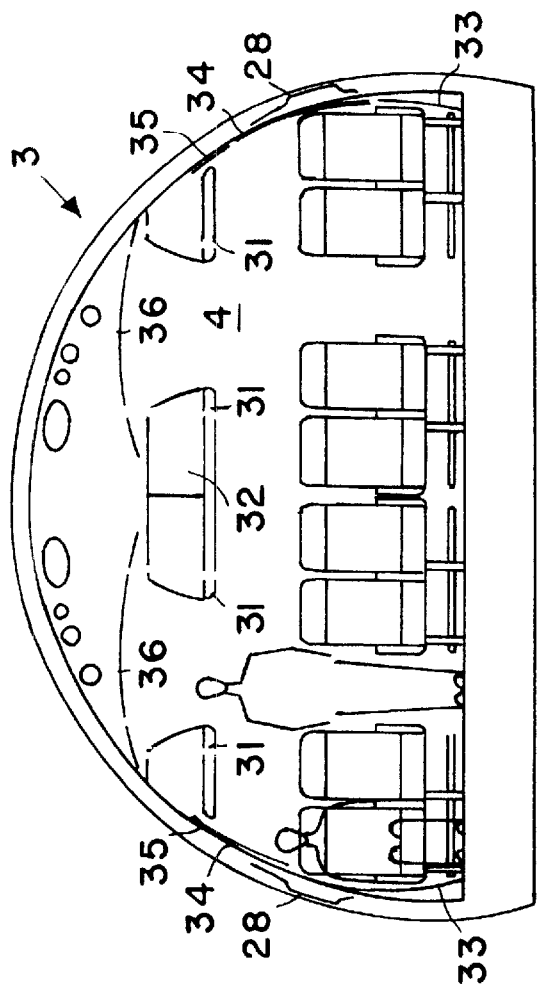
FIG. 6A corresponds to FIG. 2A, but shows a cabin arrangement according to a fifth embodiment of the invention.
FIG. 6l corresponds to FIG. 2l, but shows a cabin arrangement according to a fifth embodiment of the invention.
FIG. 6C corresponds to FIG. 2C, but shows a cabin arrangement according to a fifth embodiment of the invention.
FIG. 6D corresponds to FIG. 2D, but with respect to the fifth embodiment of the cabin arrangement as shown in FIGS. 6A, 6B and 6C.
Figure 6A:
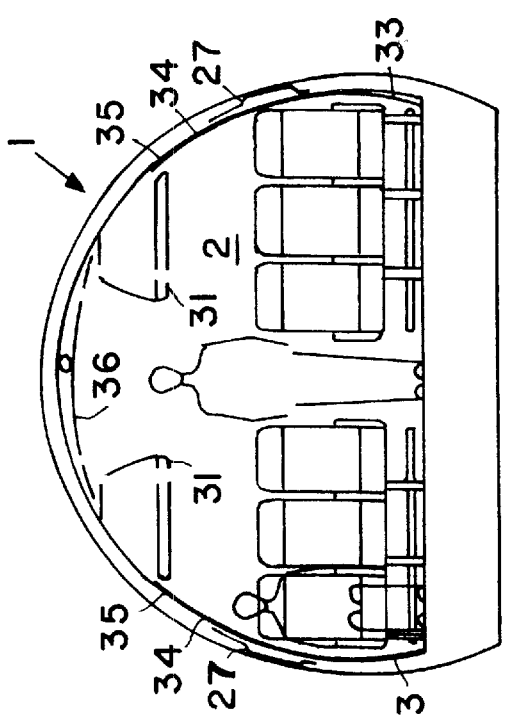
Figure 6C:
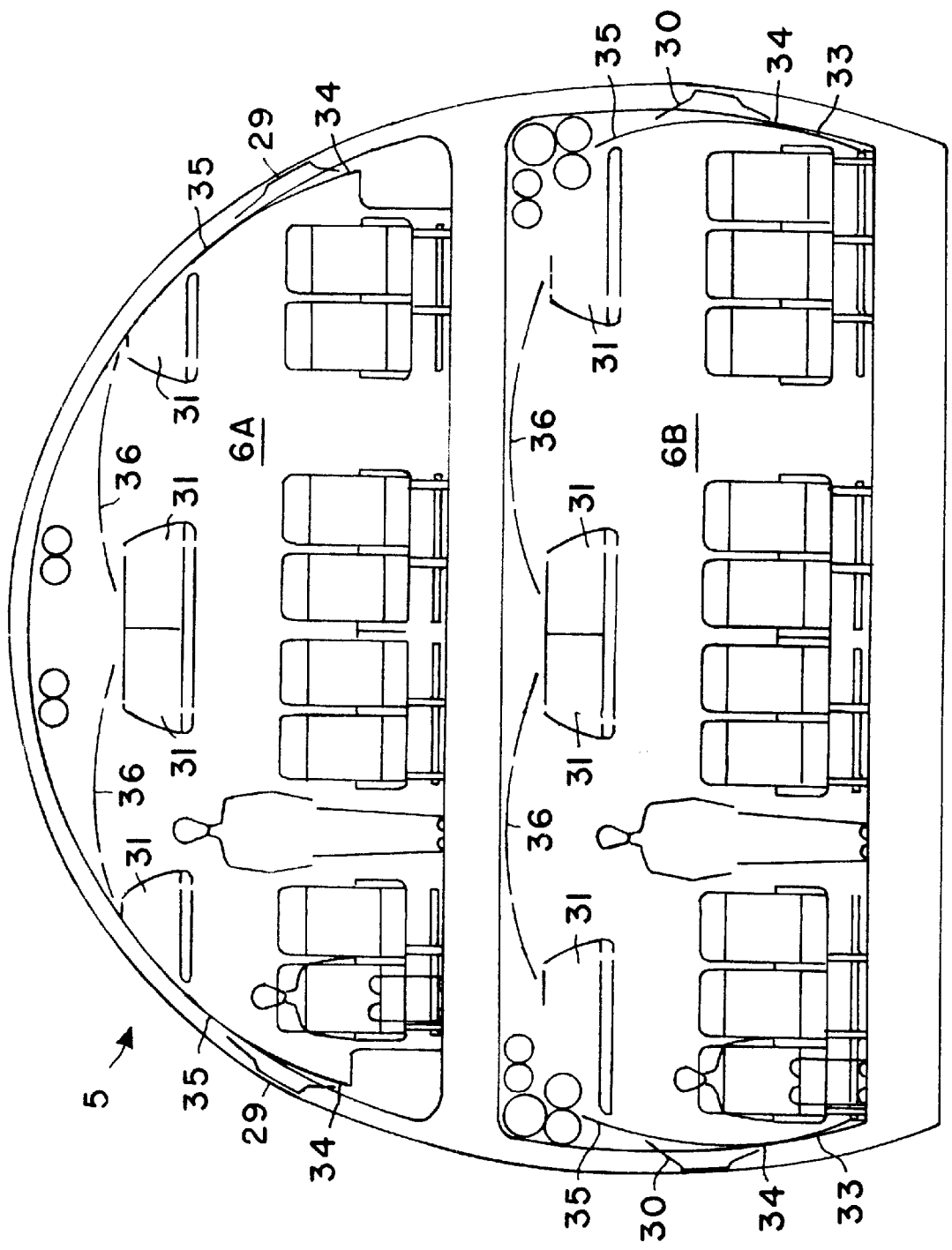

The ceiling paneling in this fifth embodiment also makes use of a combination of standardized components that are applicable to all different aircraft types, as well as specialized components for the particular passenger cabin installation, i.e. the particular aircraft type. For example, a standardized ceiling panel 36 is arranged once at the center of the ceiling area above the aisle of the aircraft cabin 2, and similarly respectively at the center of the ceiling area above each aisle of the passenger cabins 4 and 6 in the other aircraft types. In each of these cabin arrangements, smaller ceiling trim panels, which may also be standardized, or may be specialized to the particular cabin installation, are provided adjoining the two sides of each of the standardized ceiling panels 36, as shown in FIGS. 6A, 6B and 6C, without a special reference number. This embodiment further uses the type-specific or installation-specific funnels 27, 28, 29 and 30 as discussed above in connection with the prior embodiment.

Figure 8:
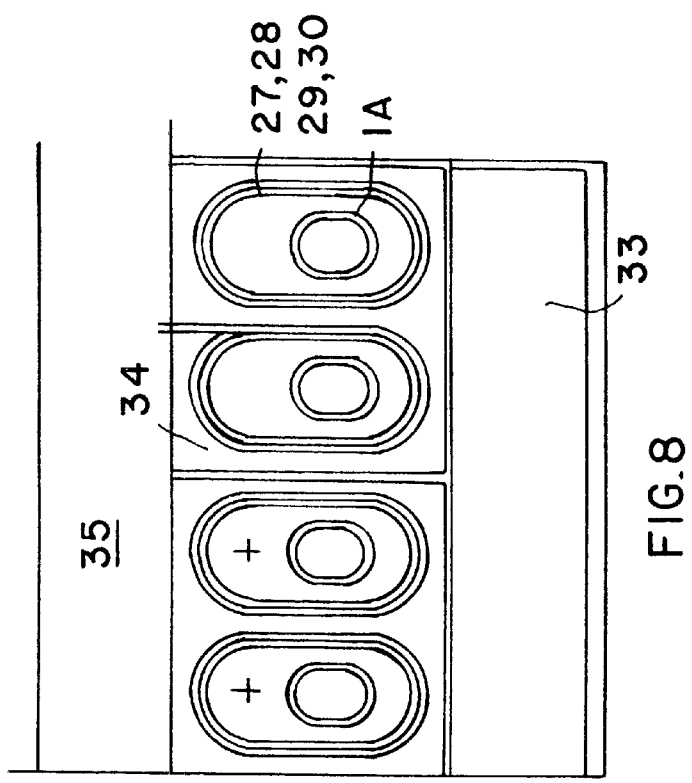
FIG. 8 schematically shows the arrangement of window funnels, in combination with sidewall panels according to the invention.
Figure 7:
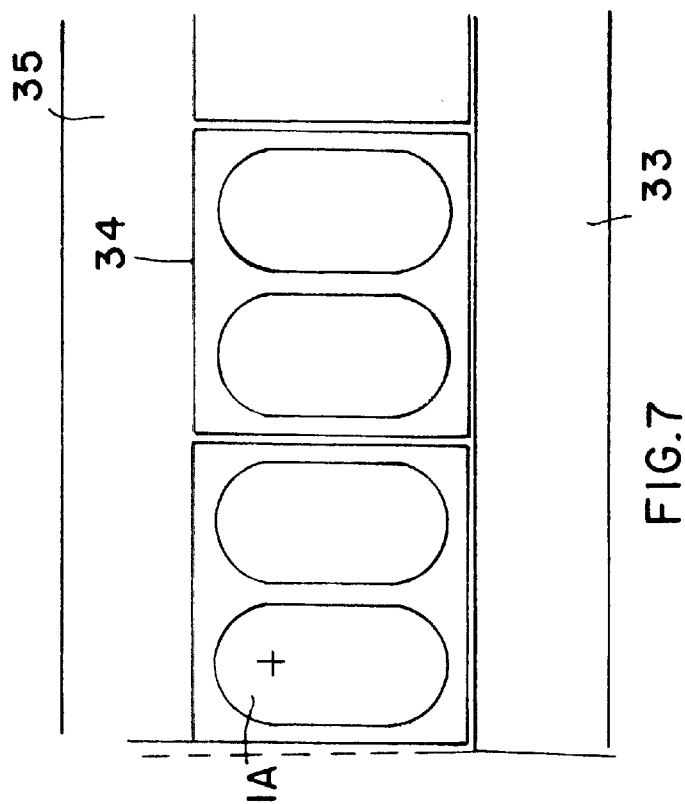
FIG. 7 schematically shows a front view of a sidewall panel according to the invention.
Figure 9:
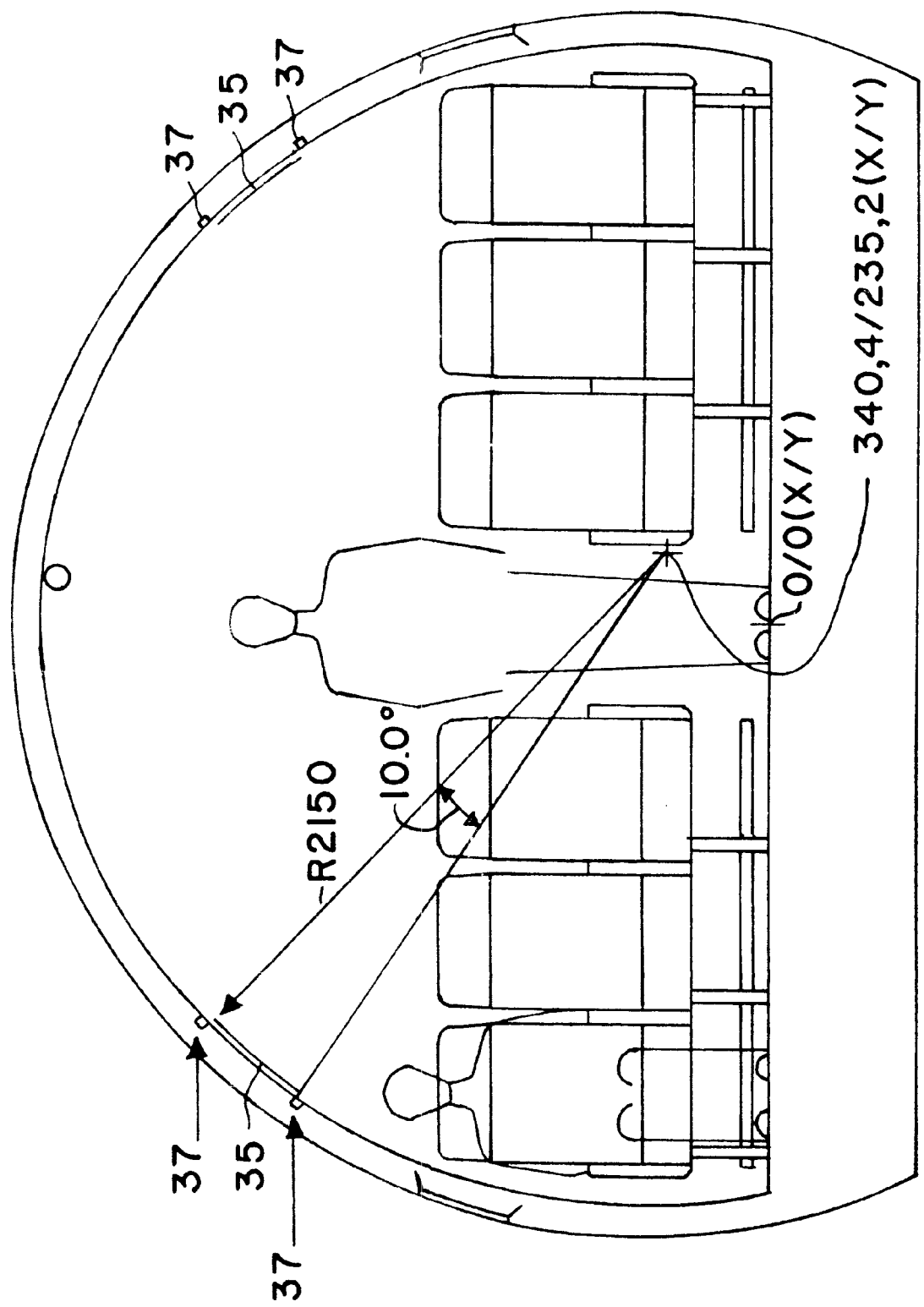
FIG. 9 schematically shows a cross-section through an aircraft passenger cabin equipped with system mounting rails and an upper sidewall panel mounted thereon, according to the invention.

To facilitate a further understanding, FIGS. 7 to 9 each show an individual trim component in detail. FIG. 7 shows two sidewall panels, for example the main sidewall panels 34, in a front view. Each sidewall panel 34 is provided with an opening for a respective window 1A, 3A or 5A, whereby this opening is preferably fit to a respective matching window funnel 27, 28, 29 or 30 to transition to the window opening size and to bridge the depth or wall thickness between the window and the sidewall panel, for example as shown in FIG. 8. In order to simply the installation and maintenance, the sidewall panel 34 is limited in width to span a maximum of two frame fields, which includes two windows in the illustrated embodiment. According to the fifth embodiment, the upper sidewall panel 35 is arranged above the main sidewall panel 34, and a dado panel 33 adjoins the main sidewall panel 34 at the bottom thereof.

FIG. 9 schematically represents the provision of two system mounting rails 37, which are installed on the airframe, to conveniently carry the upper sidewall panels 35 in an easily installable and rapidly exchangeable manner. These system mounting rails 37 may additionally or alternatively serve as a supporting carrier for lighting fixtures, advertising or informational display surfaces, temporary or exchangeable decor surfaces or the like. The system mounting rails are preferably embodied as snap-in rails or clip-in rails, so that the respective upper sidewall panels 35 or other components can be quickly and easily snapped into place to be supported on the system mounting rails 37. This allows a simple adaptation of the shape, style, decor scheme, function, or the like of the upper sidewall panels 35 or other components mounted on the system mounting rails 37.

In this manner, the upper side wall panels 35 or other components mounted on the system mounting rails 37 can easily be adapted by the aircraft manufacturer to particular customer specifications.

For example, airline-specific modifications are easily realized, such as the variation of the passenger class zone layout, preferably by varying the decor scheme or the like of the upper sidewall panel 35. Alternatively, an airline can display its own individual logos or the like or a consistent corporate decor scheme or style through the individualized upper sidewall panels 34, without having to entirely redesign or rebuild the passenger cabin trim and outfitting arrangement, and without having to alter a great number of different trim components.

The location of the system mounting rail 37 is selected to place the upper sidewall panel 35 in a readily viewable location for the passengers in the aircraft cabin, so this exchangeable upper sidewall panel 35 has the most visual impact. As a particular example, in the fuselage 1 of the single aisle type, the rails 37 are located and spaced apart from each other such that the upper sidewall panel 35 spans an arc of 10 degrees at a radius of 2150 mm from a vertex point on an opposite side of the cabin at a location about 340 mm above and about 235 mm laterally from the centerline of the cabin floor of the center aisle, as shown in FIG. 9.

All of the above detailed embodiments are merely examples of the basic core concept of the invention, namely to provide standardized components that can be used uniformly and interchangeably in different passenger cabin configurations among several different aircraft types. By providing a modular assembly and combination of such standardized building block components, the manufacturing, installation, maintenance, replacement and inventorying of the components becomes more efficient and economical through a reduction of the multiplicity of different types of components.

Moreover, the standardized components can be used in combination with specialized trim components that are particularly adapted to the fuselage size and configuration of the fuselage in which they are to be installed. In this manner, the specific dimensional relationships of an individual passenger cabin can be better accommodated, to optimize the use of the available space, while still achieving the efficiencies and economies of using the standardized components as mentioned above.

It is further possible to embody the components themselves in a modular manner, whereby each component is adjustably or adaptably made up of more than one sub-component, in order to achieve a uniformalization in combination with an increased piece count of each respective type of component, while reducing the associated manufacturing costs, and while better meeting the specific requirements such as specific dimensions of the different aircraft passenger cabins.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft passenger cabin outfitting system comprising:
   a first aircraft fuselage having a first cross-sectional dimension, and having a first passenger cabin therein adapted to said first cross-sectional dimension;
   a second aircraft fuselage having a second cross-sectional dimension different from said first cross-sectional dimension, and having a second passenger cabin therein adapted to said second cross-sectional dimension;
   a plurality of cabin interior sidewall panels that all respectively have the same dimensions and the same configuration as each other, wherein a first one of said sidewall panels is installed in said first passenger cabin in said first aircraft fuselage and a second one of said sidewall panels is installed in said second passenger cabin in said second aircraft fuselage; and
   a plurality of light covers that all respectively have the same dimensions and the same configuration as each other, wherein a first one of said light covers is installed in said first passenger cabin in said first aircraft fuselage, a second one of said light covers is installed in said second passenger cabin in said second aircraft fuselage, said light covers are respectively arranged overlapping respective upper portions of said sidewall panels, and a size of said upper portions of said sidewall panels overlapped by said light covers in said first passenger cabin is different from a size of said upper portions of said sidewall panels overlapped by said light covers in said second passenger cabin.

2. An aircraft passenger cabin outfitting system comprising:
   a first aircraft fuselage having a first cross-sectional dimension, and having a first passenger cabin therein adapted to said first cross-sectional dimension;
   a second aircraft fuselage having a second cross-sectional dimension different from said first cross-sectional dimension, and having a second passenger cabin therein adapted to said second cross-sectional dimension;
   a plurality of cabin interior sidewall panels that all respectively have the same dimensions and the same configuration as each other, wherein a first one of said sidewall panels is installed in said first passenger cabin in said first aircraft fuselage and a second one of said sidewall panels is installed in said second passenger cabin in said second aircraft fuselage;
   a plurality of stowage bins that all respectively have the same dimensions and the same configuration as each other, wherein a first one of said stowage bins is installed in said first passenger cabin in said first aircraft fuselage, a second one of said stowage bins is installed in said second passenger cabin in said second aircraft fuselage, respective gaps are formed between said sidewall panels and said stowage bins, and said gaps in said first passenger cabin have a different size than said gaps in said second passenger cabin; and a plurality of first light covers, and a plurality of second light covers that respectively have different dimensions relative to said first light covers, wherein said first light covers are installed to cover said gaps in said first passenger cabin, and said second light covers are installed to cover said gaps in said second passenger cabin.

3. An aircraft passenger cabin outfitting system comprising:
  a first aircraft fuselage having a first cross-sectional dimension, and having a first passenger cabin therein adapted to said first cross-sectional dimension;
  a second aircraft fuselage having a second cross-sectional dimension different from said first cross-sectional dimension, and having a second passenger cabin therein adapted to said second cross-sectional dimension; and
  a plurality of cabin interior components selected from among cabin trim components and cabin stowage bin components;
  wherein:
    said cabin trim components are one of: entire sidewall panels, main sidewall panels, upper sidewall panels, dado panels, ceiling panels, and cabin general illumination light covers;
    said cabin interior components all respectively have the same dimensions and the same configuration as each other; and
    a first one of said cabin interior components is installed in said first passenger cabin in said first aircraft fuselage while maintaining said same dimensions and said same configuration, and a second one of said cabin interior components is installed in said second passenger cabin in said second aircraft fuselage while maintaining said same dimensions and said same configuration.

4. The aircraft passenger cabin outfitting system according to claim 3, wherein said cabin interior components are said cabin stowage bin components, which are selected from the group consisting of complete stowage bins and stowage bin component modules.

5. The aircraft passenger cabin outfitting system according to claim 3, wherein said cabin interior components are said cabin trim components.

6. The aircraft passenger cabin outfitting system according to claim 5, wherein said configuration includes a cross-sectional curvature which is the same for said first one of said cabin trim components installed in said first passenger cabin and for said second one of said cabin trim components installed in said second passenger cabin.

7. The aircraft passenger cabin outfitting system according to claim 3, wherein said cabin interior components are said entire sidewall panels, said main sidewall panels, or said upper sidewall panels, and said same configuration of each of said sidewall panels has a curvature matching a fuselage curvature of said first aircraft fuselage having said first cross-sectional dimension, which is smaller than said second cross-sectional dimension of said second aircraft fuselage.

8. The aircraft passenger cabin outfitting system according to claim 3, wherein said cabin interior components are said entire sidewall panels, and each one of said entire sidewall panels has a modular construction including a main sidewall panel and an upper sidewall panel.

9. The aircraft passenger cabin outfitting system according to claim 3, further comprising system mounting rails that are installed in said first passenger cabin, and wherein said first one of said cabin interior components is removably mounted on said system mounting rails.

10. The aircraft passenger cabin outfitting system according to claim 9, wherein said cabin interior components are said upper sidewall panels, and said system mounting rails extend longitudinally along said first aircraft fuselage in said first passenger cabin on an upper sidewall area of said first aircraft fuselage.

11. The aircraft passenger cabin outfitting system according to claim 3, further comprising modular stowage bin bodies installed in said first passenger cabin and said second passenger cabin, wherein said cabin interior components are said cabin stowage bin components, which comprise stowage bin fronts that include stowage bin access doors, and that are connected to said modular stowage bin bodies.

12. The aircraft passenger cabin outfitting system according to claim 3, wherein said first passenger cabin and said second passenger cabin each respectively have therein a center seating group with two passenger aisles on opposite sides of said center seating group, said cabin interior components are said cabin stowage bin components, which comprise modular center stowage bin components that are arranged in said first passenger cabin and said second passenger cabin respectively above said center seating group and that are each accessible from both of said passenger aisles.

13. The aircraft passenger cabin outfitting system according to claim 3, further comprising a plurality of first window funnels, and a plurality of second window funnels having a different funnel depth in comparison to said first window funnels, wherein said first aircraft fuselage and said second aircraft fuselage respectively have windows therein, said cabin interior components are said entire sidewall panels or said main sidewall panels with window openings therein, said first window funnels are installed in said first passenger cabin to respectively transition from said window openings in said sidewall panels to said windows in said first aircraft fuselage, and said second window funnels are installed in said second passenger cabin to respectively transition from said window openings in said sidewall panels to said windows in said second aircraft fuselage.

14. The aircraft passenger cabin outfitting system according to claim 3, further comprising supplementary ceiling panels, wherein said first cross-sectional dimension of said first aircraft fuselage is smaller than said second cross-sectional dimension of said second aircraft fuselage, said first passenger cabin has a first ceiling area size, said second passenger cabin has a second ceiling area size larger than said first ceiling area size, said cabin interior components are said ceiling panels comprising main ceiling panels adapted to fit said first ceiling area size in said first passenger cabin, and said supplementary ceiling panels have a size different from said main ceiling panels and are installed only in said second passenger cabin together with said main ceiling panels so as to fit said second ceiling area size.

15. The aircraft passenger cabin outfitting system according to claim 14, wherein a plurality of said main ceiling panels are arranged together symmetrically side-by-side with respect to a longitudinal center plane of said first aircraft fuselage so as to cover said first ceiling area size.

16. The aircraft passenger cabin outfitting system according to claim 3, wherein said first passenger cabin is a single aisle cabin having two lateral seating groups with a single center aisle therebetween, and said second passenger cabin is a multi-aisle cabin having a center seating group with two aisles on opposite sides thereof.

17. The aircraft passenger cabin outfitting system according to claim 16, wherein said cabin interior components are said cabin stowage bin components, which comprise stowage bins, and wherein respective ones of said stowage bins are installed respectively above said two lateral seating groups in said first passenger cabin and above said center seating group in said second passenger cabin.

18. The aircraft passenger cabin outfitting system according to claim 17, further comprising a third aircraft fuselage which is a multi-deck fuselage having therein an upper deck passenger cabin and a middle deck passenger cabin below said upper deck passenger cabin, wherein respective further ones of said stowage bins are respectively installed in said upper deck passenger cabin and said middle deck passenger cabin.

19. The aircraft passenger cabin outfitting system according to claim 16, further comprising a third aircraft fuselage which is a multi-deck fuselage having therein an upper deck passenger cabin and a middle deck passenger cabin below said upper deck passenger cabin, wherein respective further ones of said cabin interior components are respectively installed in said upper deck passenger cabin and said middle deck passenger cabin.

20. The aircraft passenger cabin outfitting system according to claim 19, wherein said cabin interior components are said entire sidewall panels, said main sidewall panels or said upper sidewall panels.

21. The aircraft passenger cabin outfitting system according to claim 19, wherein said cabin interior components are said ceiling panels.

22. The aircraft passenger cabin outfitting system according to claim 16, wherein said cabin interior components are said entire sidewall panels, said main sidewall panels, or said upper sidewall panels.

23. The aircraft passenger cabin outfitting system according to claim 16, wherein said cabin interior components are said ceiling panels.

24. The aircraft passenger cabin outfitting system according to claim 3, wherein said first aircraft fuselage is a single deck fuselage, said second aircraft fuselage is a multi-deck fuselage with an upper deck and a middle deck, said second passenger cabin is an upper deck cabin in said upper deck, said second aircraft fuselage further has a third passenger cabin in said middle deck, and respective further ones of said cabin interior components are installed in said third passenger cabin.

25. The aircraft passenger cabin outfitting system according to claim 24, wherein said cabin interior components are said entire sidewall panels, said main sidewall panels or said upper sidewall panels.

26. The aircraft passenger cabin outfitting system according to claim 24, wherein said cabin interior components are said ceiling panels.

27. The aircraft passenger cabin outfitting system according to claim 24, wherein said cabin interior components are said cabin stowage bin components, which comprise stowage bins.

28. The aircraft passenger cabin outfitting system according to claim 3, wherein said cabin interior components are said entire sidewall panels, said main sidewall panels or said upper sidewall panels, further comprising a plurality of ceiling panels that all respectively have the same dimensions and the same configuration as each other, and wherein a first one of said ceiling panels is installed in said first passenger cabin, and a second one of said ceiling panels is installed in said second passenger cabin.

29. The aircraft passenger cabin outfitting system according to claim 28, further comprising a plurality of stowage bins that all respectively have the same dimensions and the same configurations as each other and that are installed in said first passenger cabin and said second passenger cabin.

30. The aircraft passenger cabin outfitting system according to claim 29, further comprising a plurality of dado panels that all respectively have the same dimensions and the same configurations as each other and that are installed in said first passenger cabin and said second passenger cabin.

31. An aircraft passenger cabin outfitting system comprising:

a first aircraft fuselage having a first cross-sectional dimension, and having a first passenger cabin therein adapted to said first cross-sectional dimension;

a second aircraft fuselage having a second cross-sectional dimension different from said first cross-sectional dimension, and having a second passenger cabin therein adapted to said second cross-sectional dimension;

plurality of first cabin interior components selected from among cabin trim components and cabin stowage bins, that all respectively have the same first dimensions and the same first form-stable configuration as each other; and a plurality of second cabin interior components selected from among cabin trim components and cabin stowage bins, that all respectively have the same second dimensions and the same second form-stable configuration as each other;

wherein one of said first cabin interior components and one of said second cabin interior components are installed in said first passenger cabin in said first aircraft fuselage while respectively maintaining said first form-stable configuration and said second form-stable configuration, and while overlapping each other in a first overlapping range in a circumferential direction in said first aircraft fuselage; and wherein another of said first cabin interior components and another of said second cabin interior components are installed in said second passenger cabin in said second aircraft fuselage while respectively maintaining said first form-stable configuration and said second form-stable configuration, and while overlapping each other in a second overlapping range in a circumferential direction in said second aircraft fuselage, wherein said second overlapping range has a different size than said first overlapping range.

32. An aircraft passenger cabin outfitting system comprising:

a first aircraft fuselage having a first cross-sectional dimension, and having a first passenger cabin therein adapted to said first cross-sectional dimension;

a second aircraft fuselage having a second cross-sectional dimension different from said first cross-sectional dimension, and having a second passenger cabin therein adapted to said second cross-sectional dimension; and plural first cabin interior components and plural second cabin interior components, that are each selected from among cabin trim components and cabin stowage bins;

wherein said first cabin interior components all respectively have the same first dimensions and the same first form-stable configuration as each other, and said second cabin interior components all respectively have the same second dimensions and the same second form-stable configuration as each other; and wherein a first selected number of said first and second cabin interior components are installed in a first modular arrangement in said first passenger cabin in said first aircraft fuselage while maintaining said respective form-stable configurations of said respective cabin interior components, and a second selected number of said first and second cabin interior components are installed in a second modular arrangement in said second passenger cabin in said second aircraft fuselage while maintaining said respective form-stable configurations of said respective cabin interior components, and wherein said second selected number differs from said first selected number and/or said second modular arrangement differs from said first modular arrangement.

* * * * *

UNITED STATES PATENT AND TRADEMARK OFFICE
CERTIFICATE OF CORRECTION

PATENT NO.    : 6,547,184 B2
DATED         : April 15, 2003
INVENTOR(S)   : Nieberle It is certified that error appears in the above-identified patent and that said Letters Patent is hereby corrected as shown below:

Column 6,
Line 17, after "FIG." (1st occurrence), replace "61" by -- 6B --; after "FIG." (2nd occurrence), replace "21," by -- 2B --.

Column 7,
Line 36, after "fuselage", insert -- 5 --.

Column 9,
Line 13, after "above", delete ".".

Signed and Sealed this

First Day of July, 2003

JAMES E. ROGAN
*Director of the United States Patent and Trademark Office*